United States Patent
Silva et al.

(10) Patent No.: US 11,798,250 B2
(45) Date of Patent: Oct. 24, 2023

(54) NEURAL NETWORK BASED PHYSICAL CONDITION EVALUATION OF ELECTRONIC DEVICES, AND ASSOCIATED SYSTEMS AND METHODS

(71) Applicant: ecoATM, LLC, San Diego, CA (US)

(72) Inventors: John Silva, San Diego, CA (US); Babak Forutanpour, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 434 days.

(21) Appl. No.: 16/794,009

(22) Filed: Feb. 18, 2020

(65) Prior Publication Data
US 2020/0265487 A1   Aug. 20, 2020

Related U.S. Application Data

(60) Provisional application No. 62/807,165, filed on Feb. 18, 2019.

(51) Int. Cl.
*G06V 10/141* (2022.01)
*G02B 27/30* (2006.01)
(Continued)

(52) U.S. Cl.
CPC .......... *G06V 10/141* (2022.01); *G02B 27/30* (2013.01); *G06N 3/08* (2013.01); *G06Q 30/0283* (2013.01);
(Continued)

(58) Field of Classification Search
CPC ...... G06Q 30/0283; G02B 27/30; G06N 3/08; G06N 3/0454; G06N 3/063; G06T 7/0004;
(Continued)

(56) References Cited

U.S. PATENT DOCUMENTS

| | | | |
|---|---|---|---|
| 3,808,439 | A | 4/1974 | Renius |
| 4,248,334 | A | 2/1981 | Hanley et al. |

(Continued)

FOREIGN PATENT DOCUMENTS

| | | |
|---|---|---|
| CA | 2760863 | 11/2010 |
| CA | 2818533 A1 | 5/2012 |

(Continued)

OTHER PUBLICATIONS

U.S. Appl. No. 16/952,340, filed Nov. 20, 2020.
(Continued)

*Primary Examiner* — Xuemei G Chen
(74) *Attorney, Agent, or Firm* — Perkins Coie LLP

(57) ABSTRACT

Systems and methods for evaluating the physical and/or cosmetic condition of electronic devices using machine learning techniques are disclosed. In one example aspect, an example system includes a kiosk that comprises an inspection plate configured to hold an electronic device, one or more light sources arranged above the inspection plate configured to direct one or more light beams towards the electronic device, and one or more cameras configured to capture at least one image of a first side of the electronic device. The system also includes one or more processors in communication with the one or more cameras configured to extract a set of features of the electronic device and determine, via a first neural network, a condition of the electronic device based on the set of features.

20 Claims, 14 Drawing Sheets

(51) Int. Cl.
  *G06N 3/08* (2023.01)
  *G06Q 30/0283* (2023.01)
  *G06T 7/00* (2017.01)
  *H04N 23/56* (2023.01)
  *G06V 10/764* (2022.01)
  *G06V 10/82* (2022.01)

(52) U.S. Cl.
  CPC .......... *G06T 7/0004* (2013.01); *G06V 10/764* (2022.01); *G06V 10/82* (2022.01); *H04N 23/56* (2023.01); *G06T 2207/20081* (2013.01); *G06T 2207/20084* (2013.01); *G06T 2207/30108* (2013.01)

(58) Field of Classification Search
  CPC . G06T 2207/20081; G06T 2207/20084; G06T 2207/30108; G06T 7/0002; G06T 7/90; G06T 2207/30168; H04N 5/2256; G06V 10/82; G06V 2201/06; G06V 10/141; G06K 9/627
  See application file for complete search history.

(56) References Cited

U.S. PATENT DOCUMENTS

| | | |
|---|---|---|
| 4,519,522 A | 5/1985 | McElwee |
| 4,593,820 A | 6/1986 | Antonie et al. |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |

(56) References Cited

U.S. PATENT DOCUMENTS

| | | | |
|---|---|---|---|
| 9,189,911 B2 | 11/2015 | Kavli et al. | |
| 9,195,979 B2 | 11/2015 | Geller | |
| 9,256,863 B2 | 2/2016 | Chayon et al. | |
| 9,317,989 B2 | 4/2016 | Grow et al. | |
| 9,355,515 B2 | 5/2016 | Brahami et al. | |
| 9,367,982 B2 | 6/2016 | Chayun et al. | |
| 9,378,606 B2 | 6/2016 | Chayun et al. | |
| 9,390,442 B2 | 7/2016 | Lyle | |
| 9,497,563 B2 | 11/2016 | Hornung et al. | |
| 9,582,101 B2 | 2/2017 | Chang et al. | |
| 9,595,238 B2 | 3/2017 | Won | |
| 9,621,947 B1 | 4/2017 | Oztaskent | |
| 9,641,997 B2 | 5/2017 | Vratskides | |
| 9,697,548 B1 | 7/2017 | Jaff et al. | |
| 9,704,142 B2 | 7/2017 | Ahn | |
| 9,818,160 B2 | 11/2017 | Bowles et al. | |
| 9,866,664 B2 | 1/2018 | Sinha et al. | |
| 9,881,284 B2 | 1/2018 | Bowles et al. | |
| 9,885,672 B2 | 2/2018 | Forutanpour et al. | |
| 9,904,911 B2 | 2/2018 | Bowles et al. | |
| 9,911,102 B2 | 3/2018 | Bowles | |
| 9,934,644 B2 | 4/2018 | Chayun et al. | |
| 10,032,140 B2 | 7/2018 | Bowles et al. | |
| 10,043,339 B2 | 8/2018 | Walker et al. | |
| 10,044,843 B2 | 8/2018 | Sinha et al. | |
| 10,055,798 B2 | 8/2018 | Bowles et al. | |
| 10,127,647 B2 | 11/2018 | Forutanpour et al. | |
| 10,157,379 B2 | 12/2018 | Singh | |
| 10,157,427 B2 | 12/2018 | Bowles et al. | |
| 10,269,110 B2 | 4/2019 | Forutanpour et al. | |
| 10,275,813 B2 | 4/2019 | Fu | |
| 10,325,440 B2 | 6/2019 | Abdelmalak et al. | |
| 10,339,509 B2 | 7/2019 | Bordeleau et al. | |
| 10,401,411 B2 | 9/2019 | Snook et al. | |
| 10,417,615 B2 | 9/2019 | Bowles et al. | |
| 10,438,174 B2 | 10/2019 | Bowles et al. | |
| 10,445,708 B2 | 10/2019 | Hunt et al. | |
| 10,475,002 B2 | 11/2019 | Silva et al. | |
| 10,496,963 B2 | 12/2019 | Silva et al. | |
| 10,572,946 B2 | 2/2020 | Bowles et al. | |
| 10,679,279 B2 | 6/2020 | Ward | |
| 10,740,891 B1 * | 8/2020 | Chen | G06T 7/0008 |
| 10,824,942 B1 * | 11/2020 | Bhotika | G06F 16/56 |
| 10,825,082 B2 | 11/2020 | Librizzi et al. | |
| 10,846,672 B2 | 11/2020 | Dion et al. | |
| 10,853,873 B2 | 12/2020 | Bowles et al. | |
| 10,860,990 B2 | 12/2020 | Bowles et al. | |
| 10,909,673 B2 | 2/2021 | Forutanpour et al. | |
| 10,970,786 B1 * | 4/2021 | Matheson | F24F 11/30 |
| 11,010,841 B2 | 5/2021 | Bowles et al. | |
| 11,024,111 B2 | 6/2021 | Abdelmalak et al. | |
| 11,080,662 B2 | 8/2021 | Bowles et al. | |
| 11,080,672 B2 | 8/2021 | Bowles | |
| 11,107,046 B2 | 8/2021 | Bowles | |
| 11,126,973 B2 | 9/2021 | Silva et al. | |
| 11,232,412 B2 | 1/2022 | Hunt et al. | |
| 11,288,789 B1 * | 3/2022 | Chen | G06T 7/001 |
| 11,315,093 B2 | 4/2022 | Bowles | |
| 11,379,886 B1 * | 7/2022 | Fields | G06Q 30/0278 |
| 2001/0025883 A1 | 10/2001 | Ichihara et al. | |
| 2001/0035425 A1 | 11/2001 | Rocco et al. | |
| 2001/0039531 A1 | 11/2001 | Aoki | |
| 2002/0014577 A1 | 2/2002 | Ulrich et al. | |
| 2002/0035515 A1 | 3/2002 | Moreno | |
| 2002/0067184 A1 | 6/2002 | Smith et al. | |
| 2002/0087413 A1 | 7/2002 | Mahaffy et al. | |
| 2002/0112177 A1 | 8/2002 | Voltmer | |
| 2002/0129170 A1 | 9/2002 | Moore et al. | |
| 2002/0157033 A1 | 10/2002 | Cox | |
| 2002/0162966 A1 | 11/2002 | Yoder | |
| 2002/0186878 A1 | 12/2002 | Hoon et al. | |
| 2003/0006277 A1 | 1/2003 | Maskatiya et al. | |
| 2003/0018897 A1 | 1/2003 | Bellis, Jr. et al. | |
| 2003/0025476 A1 | 2/2003 | Treia | |
| 2003/0036866 A1 | 2/2003 | Nair et al. | |
| 2003/0061150 A1 | 3/2003 | Kocher et al. | |
| 2003/0100707 A1 | 5/2003 | Hwang et al. | |
| 2003/0146898 A1 | 8/2003 | Kawasaki et al. | |
| 2003/0170529 A1 | 9/2003 | Sagawa | |
| 2003/0179371 A1 * | 9/2003 | Rangarajan | G01N 21/94 356/237.2 |
| 2003/0191675 A1 | 10/2003 | Murashita | |
| 2003/0197782 A1 | 10/2003 | Ashe | |
| 2003/0204289 A1 | 10/2003 | Banerjee et al. | |
| 2004/0012825 A1 | 1/2004 | Tesavis | |
| 2004/0088231 A1 | 5/2004 | Davis | |
| 2004/0114153 A1 | 6/2004 | Andersen et al. | |
| 2004/0141320 A1 | 7/2004 | Bock et al. | |
| 2004/0150815 A1 | 8/2004 | Sones et al. | |
| 2004/0156557 A1 | 8/2004 | Van Der Weij | |
| 2004/0156667 A1 | 8/2004 | Van Der Weij et al. | |
| 2004/0186744 A1 | 9/2004 | Lux | |
| 2004/0189812 A1 | 9/2004 | Gustavsson | |
| 2004/0200902 A1 | 10/2004 | Ishioroshi | |
| 2004/0205015 A1 | 10/2004 | DeLaCruz | |
| 2004/0235513 A1 | 11/2004 | O'Connell | |
| 2004/0242216 A1 | 12/2004 | Boutsikakis | |
| 2004/0262521 A1 | 12/2004 | Devitt et al. | |
| 2005/0027622 A1 | 2/2005 | Walker et al. | |
| 2005/0043897 A1 | 2/2005 | Meyer | |
| 2005/0109841 A1 | 5/2005 | Ryan et al. | |
| 2005/0128551 A1 | 6/2005 | Yang | |
| 2005/0135917 A1 | 6/2005 | Kauppila et al. | |
| 2005/0137942 A1 | 6/2005 | LaFluer | |
| 2005/0139661 A1 | 6/2005 | Eglen et al. | |
| 2005/0143149 A1 | 6/2005 | Becker et al. | |
| 2005/0167620 A1 | 8/2005 | Cho et al. | |
| 2005/0187657 A1 | 8/2005 | Hashimoto et al. | |
| 2005/0216120 A1 | 9/2005 | Rosenberg et al. | |
| 2005/0222690 A1 | 10/2005 | Wang et al. | |
| 2005/0231595 A1 | 10/2005 | Wang et al. | |
| 2005/0240958 A1 | 10/2005 | Nguyen et al. | |
| 2006/0167580 A1 | 1/2006 | Whittier | |
| 2006/0022827 A1 | 2/2006 | Highham | |
| 2006/0038114 A9 | 2/2006 | Cofer et al. | |
| 2006/0047573 A1 | 3/2006 | Mitchell et al. | |
| 2006/0074756 A1 | 4/2006 | Boykin | |
| 2006/0085158 A1 | 4/2006 | Cakiner | |
| 2006/0184379 A1 | 8/2006 | Tan et al. | |
| 2006/0195384 A1 | 8/2006 | Bauer et al. | |
| 2006/0219776 A1 | 10/2006 | Finn | |
| 2006/0229108 A1 | 10/2006 | Cehelnik | |
| 2006/0235747 A1 | 10/2006 | Hammond et al. | |
| 2006/0217152 A1 | 11/2006 | Fok et al. | |
| 2006/0258008 A1 | 11/2006 | Holler et al. | |
| 2006/0261931 A1 | 11/2006 | Cheng et al. | |
| 2006/0271431 A1 | 11/2006 | Wehr et al. | |
| 2006/0279207 A1 | 12/2006 | Wang et al. | |
| 2006/0280356 A1 | 12/2006 | Yamagashi | |
| 2007/0012665 A1 | 1/2007 | Nelson | |
| 2007/0013124 A1 | 1/2007 | Graef et al. | |
| 2007/0032098 A1 | 2/2007 | Bowles et al. | |
| 2007/0050083 A1 | 3/2007 | Signorelli | |
| 2007/0057815 A1 | 3/2007 | Foy et al. | |
| 2007/0129906 A1 | 6/2007 | Stoecker et al. | |
| 2007/0133844 A1 | 6/2007 | Waehner et al. | |
| 2007/0150403 A1 | 6/2007 | Mock et al. | |
| 2007/0140310 A1 | 7/2007 | Rolton et al. | |
| 2007/0205751 A1 | 9/2007 | Suzuki et al. | |
| 2007/0258085 A1 | 11/2007 | Robbins | |
| 2007/0263099 A1 | 11/2007 | Motta et al. | |
| 2007/0269099 A1 | 11/2007 | Nishino et al. | |
| 2007/0276911 A1 | 11/2007 | Bhumkar | |
| 2007/0281734 A1 | 12/2007 | Mizrachi | |
| 2007/0282999 A1 | 12/2007 | Tu et al. | |
| 2008/0004828 A1 | 1/2008 | Mizrachi | |
| 2008/0027581 A1 | 1/2008 | Saether et al. | |
| 2008/0033596 A1 | 2/2008 | Fausak et al. | |
| 2008/0109746 A1 | 5/2008 | Mayer | |
| 2008/0111989 A1 | 5/2008 | Dufour et al. | |
| 2008/0133432 A1 | 6/2008 | Ramseyer | |
| 2008/0149720 A1 | 6/2008 | Colville | |
| 2008/0167578 A1 | 7/2008 | Bryer et al. | |
| 2008/0177598 A1 | 7/2008 | Davie | |

(56) References Cited

U.S. PATENT DOCUMENTS

| | | |
|---|---|---|
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1* | 10/2008 | Cai .................... G03F 7/70433 382/144 |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1* | 10/2010 | Kapoor ................. H04N 19/117 375/E7.208 |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125548 A1* | 5/2016 | Bowles ............. G06Q 30/0237 705/4 |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |

(56) References Cited

U.S. PATENT DOCUMENTS

| | | |
|---|---|---|
| 2017/0091823 A1 | 3/2017 | Adinarayan et al. |
| 2017/0115235 A1* | 4/2017 | Ohlsson .............. G01N 21/94 |
| 2017/0169401 A1 | 6/2017 | Beane et al. |
| 2017/0221110 A1* | 8/2017 | Sullivan .............. G06Q 10/20 |
| 2017/0256051 A1* | 9/2017 | Dwivedi ................ G06T 7/13 |
| 2017/0278191 A1 | 9/2017 | Tassone et al. |
| 2017/0301010 A1 | 10/2017 | Bowles et al. |
| 2017/0301078 A1* | 10/2017 | Forutanpour ........ G06T 7/0004 |
| 2017/0343481 A1* | 11/2017 | Jahanshahi .......... G06N 3/0454 |
| 2017/0372465 A1* | 12/2017 | Forutanpour ........ G06V 10/42 |
| 2018/0084094 A1 | 3/2018 | Sinha et al. |
| 2018/0130136 A1* | 5/2018 | Bowles .............. G06Q 30/0278 |
| 2018/0157246 A1 | 6/2018 | Huang et al. |
| 2018/0157820 A1 | 6/2018 | Adams et al. |
| 2018/0240144 A1 | 8/2018 | Curtis |
| 2018/0247280 A1* | 8/2018 | Bowles .................... G07F 7/06 |
| 2018/0260794 A1 | 9/2018 | Bowles et al. |
| 2018/0293566 A1 | 10/2018 | Engles et al. |
| 2018/0293664 A1* | 10/2018 | Zhang ................ G06V 10/454 |
| 2018/0321163 A1* | 11/2018 | Casadio .............. G01N 21/909 |
| 2018/0322623 A1* | 11/2018 | Memo ................ G06T 7/0004 |
| 2018/0342050 A1* | 11/2018 | Fitzgerald ................ G06T 7/80 |
| 2018/0350163 A1* | 12/2018 | Pofale ................ G06Q 30/0283 |
| 2019/0019147 A1* | 1/2019 | McCarty ............. G06Q 10/087 |
| 2019/0066075 A1 | 2/2019 | Lobo et al. |
| 2019/0066439 A1 | 2/2019 | Pinkus |
| 2019/0073566 A1* | 3/2019 | Brauer .................. G06V 10/82 |
| 2019/0073568 A1* | 3/2019 | He ........................ G06V 10/40 |
| 2019/0102874 A1* | 4/2019 | Goja ................ G06F 18/2431 |
| 2019/0166278 A1* | 5/2019 | Hiyama ............... H04N 1/1056 |
| 2019/0222748 A1 | 7/2019 | Weir et al. |
| 2019/0251777 A1 | 8/2019 | Abdelmalak et al. |
| 2019/0272628 A1* | 9/2019 | Tsou .................... H04N 5/2354 |
| 2019/0279431 A1 | 9/2019 | Wurmfeld et al. |
| 2019/0287141 A1 | 9/2019 | Bordeleau et al. |
| 2019/0318465 A1 | 10/2019 | Nguyen |
| 2019/0372827 A1* | 12/2019 | Vasseur .................... H04L 41/22 |
| 2020/0020097 A1* | 1/2020 | Do .......................... G16H 50/20 |
| 2020/0042969 A1 | 2/2020 | Ray |
| 2020/0066067 A1* | 2/2020 | Herman ............... G07C 5/0808 |
| 2020/0090137 A1 | 3/2020 | Bowles et al. |
| 2020/0104720 A1* | 4/2020 | Bao ...................... G06V 10/764 |
| 2020/0151677 A1 | 5/2020 | Bowles et al. |
| 2020/0167748 A1 | 5/2020 | Dion et al. |
| 2020/0175669 A1* | 6/2020 | Bian .................... G06T 7/0004 |
| 2020/0202319 A1 | 6/2020 | Forutanpour et al. |
| 2020/0202405 A1 | 6/2020 | Glickman et al. |
| 2020/0241891 A1 | 7/2020 | Li et al. |
| 2020/0258343 A1 | 8/2020 | Forutanpour et al. |
| 2020/0259300 A1 | 8/2020 | Forutanpour et al. |
| 2020/0393742 A1 | 12/2020 | Dion et al. |
| 2021/0012315 A1 | 1/2021 | Priebatsch |
| 2021/0035206 A1 | 2/2021 | Bowles et al. |
| 2021/0081698 A1* | 3/2021 | Lindeman ............. G06Q 10/20 |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0209512 A1* | 7/2021 | Gaddam .............. H04L 63/1408 |
| 2021/0209746 A1 | 7/2021 | Johnson et al. |
| 2021/0224867 A1 | 7/2021 | Bordeleau et al. |
| 2021/0254966 A1* | 8/2021 | Hur ...................... G01B 5/0004 |
| 2021/0272208 A1* | 9/2021 | Leise .................... G06Q 40/08 |
| 2021/0295494 A1 | 9/2021 | Forutanpour et al. |
| 2022/0027879 A1 | 1/2022 | Bowles et al. |
| 2022/0050897 A1* | 2/2022 | Gaddam ................ G06N 3/006 |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0187802 A1* | 6/2022 | Wittenberg ........... H04L 9/3278 |
| 2022/0198407 A1 | 6/2022 | Beane et al. |
| 2022/0262189 A1 | 8/2022 | Dion et al. |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 102467728 A | 5/2012 |
| CN | 202351953 | 7/2012 |
| CN | 202394296 | 8/2012 |
| CN | 102654927 | 9/2012 |
| CN | 102682597 A | 9/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |

(56) References Cited

FOREIGN PATENT DOCUMENTS

| | | |
|---|---|---|
| CN | 208086545 U | 11/2018 |
| CN | 208172834 U | 11/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110321082 A | 10/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111080184 A | 4/2020 |
| CN | 210348162 U | 4/2020 |
| CN | 111175318 A | 5/2020 |
| CN | 111210473 A | 5/2020 |
| CN | 305767220 S | 5/2020 |
| CN | 111238430 A | 6/2020 |
| CN | 111242116 A | 6/2020 |
| CN | 111262987 A | 6/2020 |
| CN | 111272067 A | 6/2020 |
| CN | 111272388 A | 6/2020 |
| CN | 111272393 A | 6/2020 |
| CN | 111273704 A | 6/2020 |
| CN | 111277466 A | 6/2020 |
| CN | 111277659 A | 6/2020 |
| CN | 111277695 A | 6/2020 |
| CN | 111277696 A | 6/2020 |
| CN | 111290660 A | 6/2020 |
| CN | 111290949 A | 6/2020 |
| CN | 111291661 A | 6/2020 |
| CN | 111292302 A | 6/2020 |
| CN | 111292374 A | 6/2020 |
| CN | 111294453 A | 6/2020 |
| CN | 111294459 A | 6/2020 |
| CN | 111307429 A | 6/2020 |
| CN | 111311556 A | 6/2020 |
| CN | 111311678 A | 6/2020 |
| CN | 111311687 A | 6/2020 |
| CN | 111311749 A | 6/2020 |
| CN | 111314445 A | 6/2020 |
| CN | 111314535 A | 6/2020 |
| CN | 111325715 A | 6/2020 |
| CN | 111325716 A | 6/2020 |
| CN | 111325717 A | 6/2020 |
| CN | 111325901 A | 6/2020 |
| CN | 305818424 S | 6/2020 |
| CN | 111530774 A | 8/2020 |
| CN | 211291337 U | 8/2020 |
| CN | 211402187 U | 9/2020 |
| CN | 211515235 U | 9/2020 |
| CN | 211538600 U | 9/2020 |
| CN | 306113050 S | 10/2020 |
| CN | 306113051 S | 10/2020 |
| CN | 306113052 S | 10/2020 |
| CN | 212023984 U | 11/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 212314534 U | 1/2021 |
| CN | 212597202 U | 2/2021 |
| CN | 306323627 S | 2/2021 |
| CN | 212681731 U | 3/2021 |
| CN | 111314537 B | 4/2021 |
| CN | 213001252 U | 4/2021 |
| CN | 111327745 B | 8/2021 |
| CN | 111327746 B | 8/2021 |
| CN | 111256609 B | 9/2021 |
| CN | 202702438 U | 1/2023 |
| CN | 202711369 U | 1/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290725 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |

(56) References Cited

FOREIGN PATENT DOCUMENTS

| | | |
|---|---|---|
| JP | 2017093938 | 6/2017 |
| JP | 2019012474 | 1/2019 |
| JP | 3223233 U | 9/2019 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |

OTHER PUBLICATIONS

2006 Florida Statutes Title XXXIII, Chapter 538, Sections 538.03 and 538.04, 7 pages.

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-LCD-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Address Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Foster et al., "Automated Visual Inspection: A Tutorial" 1990 Computers Ind. Engng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recylcing," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

GSM Arena Glossary, "LCD (Liquid Crystal Display", retrieved from http://www.gsmarena.com/glossary.php3?term=lcd on Apr. 28, 2016, 1 page.

International Numbering Plan, www.numberingplans.com, 2 pages.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Kanter, James Max, "Color Crack:Identifying Cracks in Glass," dated Dec. 9, 2014; retrieved from the internet http://www.jmaxkanter.com/static/papers/color_crack.pdf on Sep. 22, 2017.

Lambert, Emily, "Use It Up, Wear It Out", Forbes 175.5 (2005): 77-78. Business Source Complete. Web. Jan. 6, 2015, 3 pages.

(56) References Cited

OTHER PUBLICATIONS

Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion dated Jun. 4, 2020 in International Application No. PCT/US2020/018681, 12 pages.

* cited by examiner

NEURAL NETWORK BASED PHYSICAL CONDITION EVALUATION OF ELECTRONIC DEVICES, AND ASSOCIATED SYSTEMS AND METHODS

CROSS-REFERENCE TO RELATED APPLICATIONS

This patent application claims priority to and the benefit of U.S. Provisional Patent Application No. 62/807,165, entitled "NEURAL NETWORK BASED PHYSICAL CONDITION EVALUATION OF ELECTRONIC DEVICES, AND ASSOCIATED SYSTEMS AND METHODS," filed Feb. 18, 2019. The entire contents of the above-mentioned patent application are incorporated herein by reference in their entirety.

TECHNICAL FIELD

The present technology is generally directed to evaluating the condition of mobile phones and/or other electronic devices, such as evaluating the presence, quantity, and/or distribution of surface scratches or cracks in such devices, based on machine learning techniques.

BACKGROUND

Consumer electronic devices, such as mobile phones, laptop computers, notebooks, tablets, MP3 players, etc., are ubiquitous. Currently, there are over 6 billion mobile devices in use in the world; and the number of these devices is growing rapidly, with more than 1.8 billion mobile phones being sold in 2013 alone. There are now more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury, and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publicly accessible areas. Such kiosks are operated by ecoATM, LLC, the assignee of the present application, and are disclosed in, for example, U.S. Pat. Nos. 8,463,646, 8,423,404, 8,239,262, 8,200,533, 8,195,511, and 7,881,965, which are commonly owned by ecoATM, LLC and are incorporated herein by reference in their entireties.

It is often necessary to visually evaluate the physical and/or cosmetic condition of an electronic device. For example, pricing the electronic device, assessing the electronic device for possible repair, and evaluating the electronic device for warranty coverage all can require identification of scratches, cracks, water damage, or other cosmetic defects in the device's screen and/or in non-screen portions of the device. Individualized manual inspection of devices can be slow, cumbersome, and can yield inconsistent results among devices. There remains a need for more efficient technologies for evaluating the physical and/or cosmetic condition of electronic devices.

DETAILED DESCRIPTION

Figure 1A:
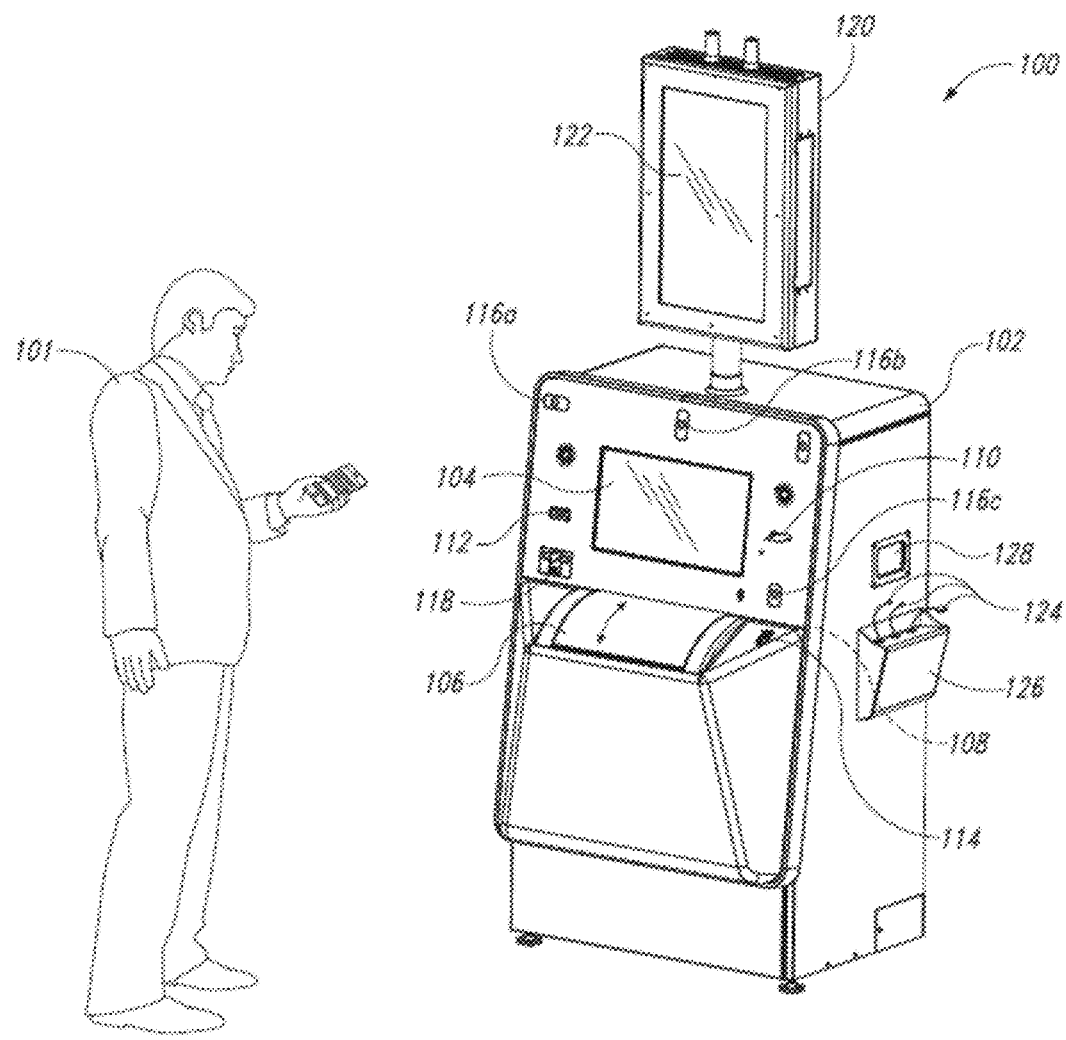
FIG. 1A is a schematic illustration of a representative operating environment having elements configured in accordance with some embodiments of the present technology.

The present disclosure describes various embodiments of systems and methods for evaluating the cosmetic and/or physical condition of mobile phones and/or other electronic devices using machine learning techniques. As described in greater detail below, in some embodiments these systems and methods can be implemented by a consumer operated kiosk to evaluate whether, for example, a display screen of a mobile phone is cracked or otherwise damaged.

Efficiently and consistently evaluating the cosmetic condition of electronic devices can be challenging. For example, manual identification of defects as shown in images of electronic devices can be costly, tedious, and subject to variability among different inspectors or even the same inspector. The manual process can also be inaccurate in many cases. For example, when the screen of the device is on, a human inspector can not be able to differentiate cosmetic defects from the background image shown on the device. As another example, a screen protector or case attached to the device can make manual inspection difficult. In this regard, certain feature- or rule-based automatic pattern recognition methods can not provide satisfactory and consistent evaluation results either. Additionally, the evaluation of cosmetic condition can not be limited to the identification of a pre-defined set of defects (e.g., scratches, cracks, dents, water damage, and/or bad pixels). Rather, the evaluation can correspond to a comprehensive, overall "look and feel" of an electronic device, such as identifying whether a device is a counterfeit product. Therefore, pre-defined feature- or rule-based methods can be inefficient and/or insufficient to handle various cosmetic evaluation scenarios.

Aspects of the present technology use machine learning techniques (artificial neural networks (ANNs) in particular) to perform cosmetic condition evaluation based on images of electronic devices, without predetermined feature(s) or rule(s). Among other things, the use of ANN(s) as described herein contributes to various advantages and improvements (e.g., in computational efficiency, detection accuracy, system robustness, etc.) in processing images of electronic devices. As those skilled in the art would appreciate, ANNs are computing systems that "learn" (i.e., progressively improve performance on) tasks by considering examples, generally without task-specific programming. For example, in image recognition, ANN can learn to identify images that contain cats by analyzing example images that have been manually labeled as "cat" or "no cat" and using the results to identify cats in other images.

An ANN is typically based on a collection of connected units or nodes called artificial neurons. Each connection between artificial neurons can transmit a signal from one artificial neuron to another. The artificial neuron that receives the signal can process it and then signal artificial neurons connected to it. Typically, in ANN implementations, the signal at a connection between artificial neurons is a real number, and the output of each artificial neuron is calculated by a non-linear function of the sum of its inputs. Artificial neurons and connections typically have a weight that adjusts as learning proceeds. The weight increases or decreases the strength of the signal at a connection. Artificial neurons can have a threshold such that only if the aggregate signal crosses that threshold is the signal sent. Typically, artificial neurons are organized in layers. Different layers can perform different kinds of transformations on their inputs. Signals travel from the first (input) to the last (output) layer, possibly after traversing the layers multiple times.

In some embodiments, one or more ANNs used by the present technology includes convolutional neural network(s) (CNN or ConvNet). Typically, CNNs use a variation of multilayer perceptrons designed to require minimal pre-processing. CNNs can also be shift invariant or space invariant artificial neural networks (SIANN), based on their shared-weights architecture and translation invariance characteristics. Illustratively, CNNs were inspired by biological processes in that the connectivity pattern between neurons resembles the organization of the animal visual cortex. Individual cortical neurons respond to stimuli only in a restricted region of the visual field known as the receptive field. The receptive fields of different neurons partially overlap such that they cover the entire visual field.

FIGS. 1A-E illustrate details about a kiosk model in accordance with some embodiments of the present technology. FIG. 1A illustrates an example kiosk 100 for recycling, selling, and/or other processing of mobile phones and other consumer electronic devices in accordance with some embodiments of the present technology. In some embodiments, at least some portions of the technology described herein can be carried out using a kiosk that includes an imaging device therein. For example, the kiosk can process and evaluate images received from the imaging device. The kiosk can include, for example, a processing component (e.g., including one or more physical processors) and memory storing instructions that, when executed by the processing component, perform at least some operations described herein. The term "processing" is used herein for ease of reference to generally refer to all manner of services and operations that can be performed or facilitated by the kiosk 100 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc., mobile phones and other electronic devices. Although many embodiments of the present technology are described herein in the context of mobile phones, aspects of the present technology are not limited to mobile phones and can generally apply to other consumer electronic devices. Such devices include, as non-limiting examples, all manner of mobile phones; smartphones; handheld devices; personal digital assistants (PDAs); MP3 or other digital music players; tablet, notebook, ultrabook, and laptop computers; e-readers all types; GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch™, Android Wear™ devices such as the Moto 360®, or the Pebble Steel™ watch), etc. The kiosk 100 and various features thereof can be at least generally similar in structure and function to the systems, methods and corresponding features described in the following patents and patent applications, which are incorporated herein by reference in their entireties: U.S. Pat. Nos. 10,127,647, 10,055,798; 10,032, 140; 9,904,911; 9,881,284; 8,200,533; 8,195,511; 8,463, 646; 8,423,404; 8,239,262; 8,200,533; 8,195,511; and 7,881, 965; U.S. patent application Ser. Nos. 12/573,089; 12/727, 624; 13/113,497; 12/785,465; 13/017,560; 13/438,924; 13/753,539; 13/658,825; 13/733,984; 13/705,252; 13/487, 299; 13/492,835; 13/562,292; 13/658,828; 13/693,032; 13/792,030; 13/794,814; 13/794,816; 13/862,395; 13/913, 408; U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. patent application Ser. No. 14/873,158, titled "WIRELESS-ENABLED KIOSK FOR RECYCLING CONSUMER DEVICES," filed by the applicant on Oct. 1, 2015; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. patent application Ser. No. 14/925,357, titled "SYSTEMS AND METHODS FOR RECYCLING CONSUMER ELECTRONIC DEVICES," filed by the applicant on Oct. 28, 2015; U.S. patent application Ser. No. 14/925,375, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 28, 2015; U.S. patent application Ser. No. 14/934,134, titled "METHODS AND SYSTEMS FOR EVALUATING AND RECYCLING ELECTRONIC DEVICES," filed by the applicant on Nov. 5, 2015; U.S. patent application Ser. No. 14/964,963, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 10, 2015; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. patent application Ser. No. 14/966,346, titled "SYSTEMS AND METHODS FOR RECYCLING CONSUMER ELECTRONIC DEVICES," filed by the applicant on Dec. 11, 2015; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; and U.S. patent application Ser. No. 15/057,707, titled "METHODS AND SYSTEMS FOR INTERACTIONS WITH A SYSTEM FOR PURCHASING MOBILE PHONES AND OTHER ELECTRONIC DEVICES," filed by the applicant on Mar. 1, 2016; U.S. patent application Ser. No. 15/176,975, titled "METHODS AND SYSTEMS FOR DETECTING SCREEN COVERS ON ELECTRONIC DEVICES," filed by the applicant on Jun. 8, 2016. In some embodiments, the kiosk 100 can share many or all of the features of the kiosks disclosed and described in U.S. patent application Ser. No. 16/719,699, entitled "SYSTEMS AND METHODS FOR VENDING AND/OR PURCHASING MOBILE PHONES AND OTHER ELECTRONIC DEVICES," filed on Dec. 18, 2019, U.S. patent application Ser. No. 16/788,169, entitled KIOSK FOR EVALUATING AND PURCHASING USED ELECTRONIC DEVICES, filed on Feb. 11, 2020, U.S. patent application Ser. No. 16/788,153, entitled "CONNECTOR CARRIER FOR ELECTRONIC DEVICE KIOSK," filed on Feb. 11, 2020, and U.S. Provisional Application No. 62/950,075, entitled "SYSTEMS AND METHODS FOR VENDING AND/OR PURCHASING MOBILE PHONES AND OTHER ELECTRONIC DEVICES," filed on Dec. 18, 2019. All the patents and patent applications listed in the preceding sentences and any other patents or patent applications identified herein are incorporated herein by reference in their entireties.

In the illustrated embodiment, the kiosk 100 is a floor-standing self-service kiosk configured for use by a user 101 (e.g., a consumer, customer, etc.) to recycle, sell, and/or perform other operations with a mobile phone or other consumer electronic device. In other embodiments, the kiosk 100 can be configured for use on a countertop or a similar raised surface. Although the kiosk 100 is configured for use by consumers, in various embodiments the kiosk 100 and/or various portions thereof can also be used by other operators, such as a retail clerk or kiosk assistant to facilitate the selling or other processing of mobile phones and other electronic devices.

In the illustrated embodiment, the kiosk 100 includes a housing 102 that is approximately the size of a conventional vending machine. The housing 102 can be of conventional manufacture from, for example, sheet metal, plastic panels, etc. A plurality of user interface devices is provided on a front portion of the housing 102 for providing instructions and other information to users, and/or for receiving user inputs and other information from users. For example, the kiosk 100 can include a display screen 104 (e.g., a liquid crystal display (LCD) or light emitting diode (LED) display screen, a projected display (such as a heads-up display or a head-mounted device), etc.) for providing information, prompts, and so on, to users. The display screen 104 can include a touch screen for receiving user input and responses to displayed prompts. In some embodiments, the kiosk 100 can include a separate keyboard or keypad for this purpose. The kiosk 100 can also include an ID reader or scanner 112 (e.g., a driver's license scanner), a fingerprint reader 114, and one or more cameras 116a-c (e.g., digital still and/or video cameras, identified individually as cameras). The kiosk 100 can additionally include output devices, such as a label printer having an outlet 110, and a cash dispenser having an outlet 118. Although not identified in FIGS. 1A-1E, the kiosk 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices can include a touchpad, pointing device such as a mouse, joystick, pen, game pad, motion sensor, scanner, eye direction monitoring system, etc. Additionally, the kiosk 100 can also include a bar code reader, QR code reader, bag/package dispenser, a digital signature pad, etc. In the illustrated embodiment, the kiosk 100 additionally includes a header 120 having a display screen 122 for displaying marketing advertisements and/or other video or graphical information to attract users to the kiosk. In addition to the user interface devices described above, the front portion of the housing 102 also includes an access panel or door 106 located directly beneath the display screen 104. The access door can be configured to automatically retract so that the user 101 can place an electronic device (e.g., a mobile phone) in an inspection area 108 for automatic inspection, evaluation, and/or other processing by the kiosk 100.

A sidewall portion of the housing 102 can include a number of conveniences to help users recycle or otherwise process their mobile phones. For example, in the illustrated embodiment the kiosk 100 includes an accessory bin 128 that is configured to receive mobile device accessories that the user wishes to recycle or otherwise dispose of. Additionally, the kiosk 100 can provide a free charging station 126 with a plurality of electrical connectors 124 for charging a wide variety of mobile phones and other consumer electronic devices.

Figure 1C:
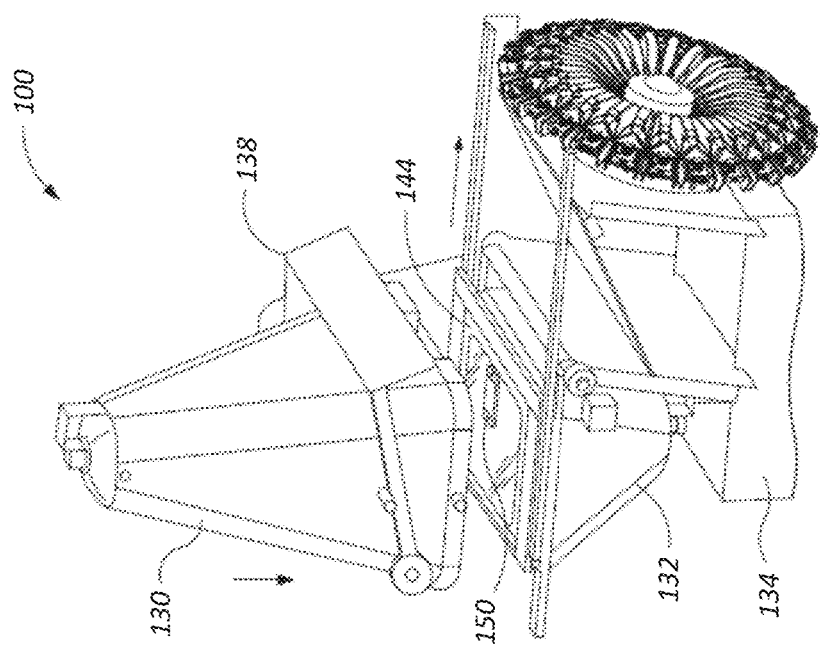
FIGS. 1B-1E are a series of isometric views of the kiosk shown in FIG. 1A with the housing removed to illustrate selected internal components configured in accordance with some embodiments of the present technology.
Figure 1B:
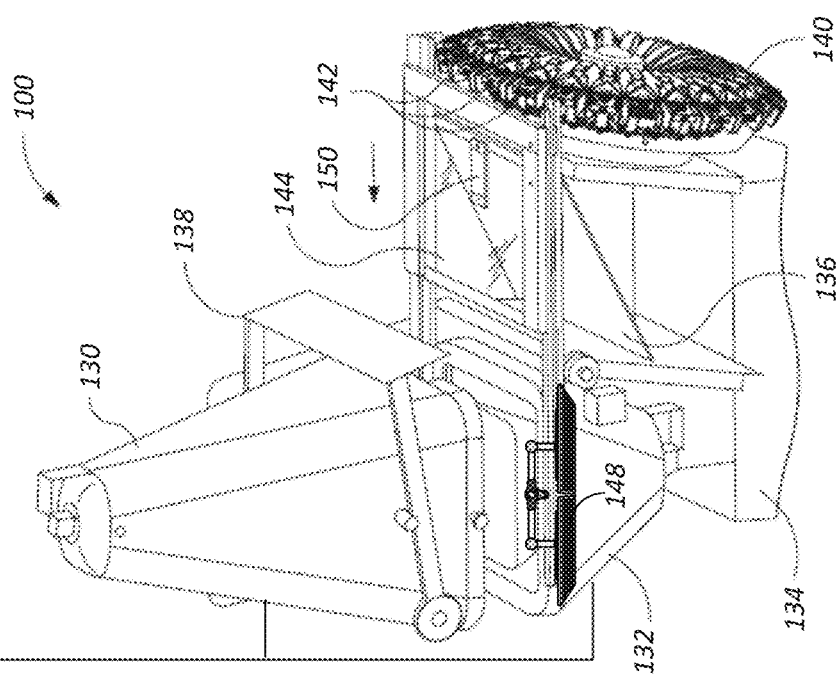

FIGS. 1B-1E illustrate a series of isometric views of the kiosk 100 with the housing 102 removed to illustrate selected internal components configured in accordance with some embodiments of the present technology. Referring first to FIG. 1B, in the illustrated embodiment the kiosk 100 includes a connector carrier 140 and an inspection plate 144 operably disposed behind the access door 106 as shown in FIG. 1A. In the illustrated embodiment, the connector carrier 140 is a rotatable carrousel that is configured to rotate about a generally horizontal axis and carries a plurality of electrical connectors 142 (e.g., approximately 25 connectors) distributed around an outer periphery thereof. In other embodiments, other types of connector carrying devices (including both fixed and movable arrangements) can be used. In some embodiments, the connectors 142 includes a plurality of interchangeable USB connectors configured to provide power and/or exchange data with a variety of different mobile phones and/or other electronic devices. In operation, the connector carrier 140 is configured to automatically rotate about its axis to position an appropriate one of the connectors 142 adjacent to an electronic device, such as a mobile phone 150, that has been placed on the inspection plate 144 for recycling. The connector 142 can then be manually and/or automatically withdrawn from the connector carrier 140 and connected to a port on the mobile phone 150 for electrical analysis. Such analysis can include, for example, an evaluation of the make, model, configuration, condition, etc.

In the illustrated embodiment, the inspection plate 144 is configured to translate back and forth (on, e.g., parallel mounting tracks) to move an electronic device, such as the mobile phone 150, between a first position directly behind the access door 106 and a second position between an upper chamber 130 and an opposing lower chamber 132. Moreover, in this embodiment the inspection plate 144 is transparent, or at least partially transparent (e.g., formed of glass, Plexiglas, etc.) to enable the mobile phone 150 to be photographed and/or otherwise optically evaluated from all, or at least most viewing angles (e.g., top, bottom, sides, etc.) using an imaging device 190 (e.g., one or more cameras) mounted to or otherwise associated with the upper and lower chambers 130 and 132. When the mobile phone 150 is in the second position, the upper chamber 130 can translate downwardly to generally enclose the mobile phone 150 between the upper chamber 130 and the lower chamber 132. The upper chamber 130 is operably coupled to a gate 138 that moves up and down in unison with the upper chamber 130.

In some embodiments, the imaging device 190 can include one or more cameras disposed within both the upper chamber 130 and the lower chamber 132 to capture images of top and bottom surfaces of the mobile device 150 in order to detect cracks and/or scratches in the screen. The upper chamber 130 and/or the lower chamber 132 can include one or more light sources (e.g., spotlights) to allow the imaging device 190 to capture high quality images that demonstrate cosmetic defects on the mobile device 150.

Figure 9A:
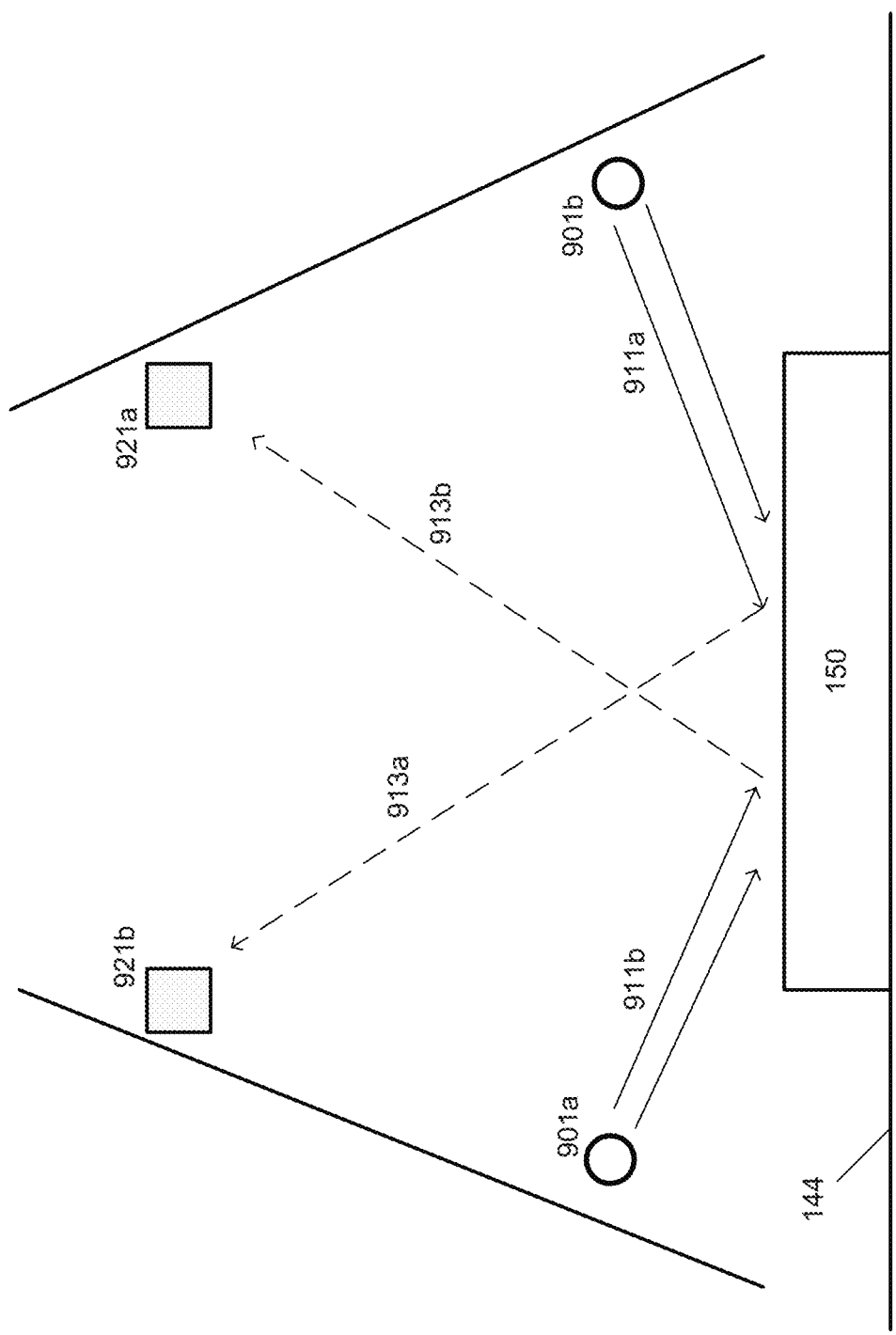
FIG. 9A illustrates a side view of an example arrangement of light sources $901a,b$ in the upper chamber in accordance with one or more embodiments of the present technology.

In some embodiments, the one or more light sources are arranged in the upper chamber 130 and/or the lower chamber 132. FIG. 9A illustrates a side view of an example arrangement of light sources 901a,b in the upper chamber in accordance with one or more embodiments of the present technology. The light beams 911a,b from the light sources 901a,b form small angles (e.g., equal to or smaller than 60 degrees) with respect to the display of the mobile phone 150 to avoid direct reflection of the lights from the highly reflective display of the mobile phone 150. The relative positions between the one or more light sources 901a,b and the one or more cameras 921a,b of the imaging device 190 can be adjusted to ensure that the reflected light beams 913a,b from the mobile phone 150 can reach the cameras 921a,b. In some embodiments, kiosks can perform self-calibration to adjust the angles of the light sources to ensure that the correct angles are formed. In some embodiments, technicians can be dispatched periodically or upon request to perform calibrations of the kiosks.

Figure 9B:
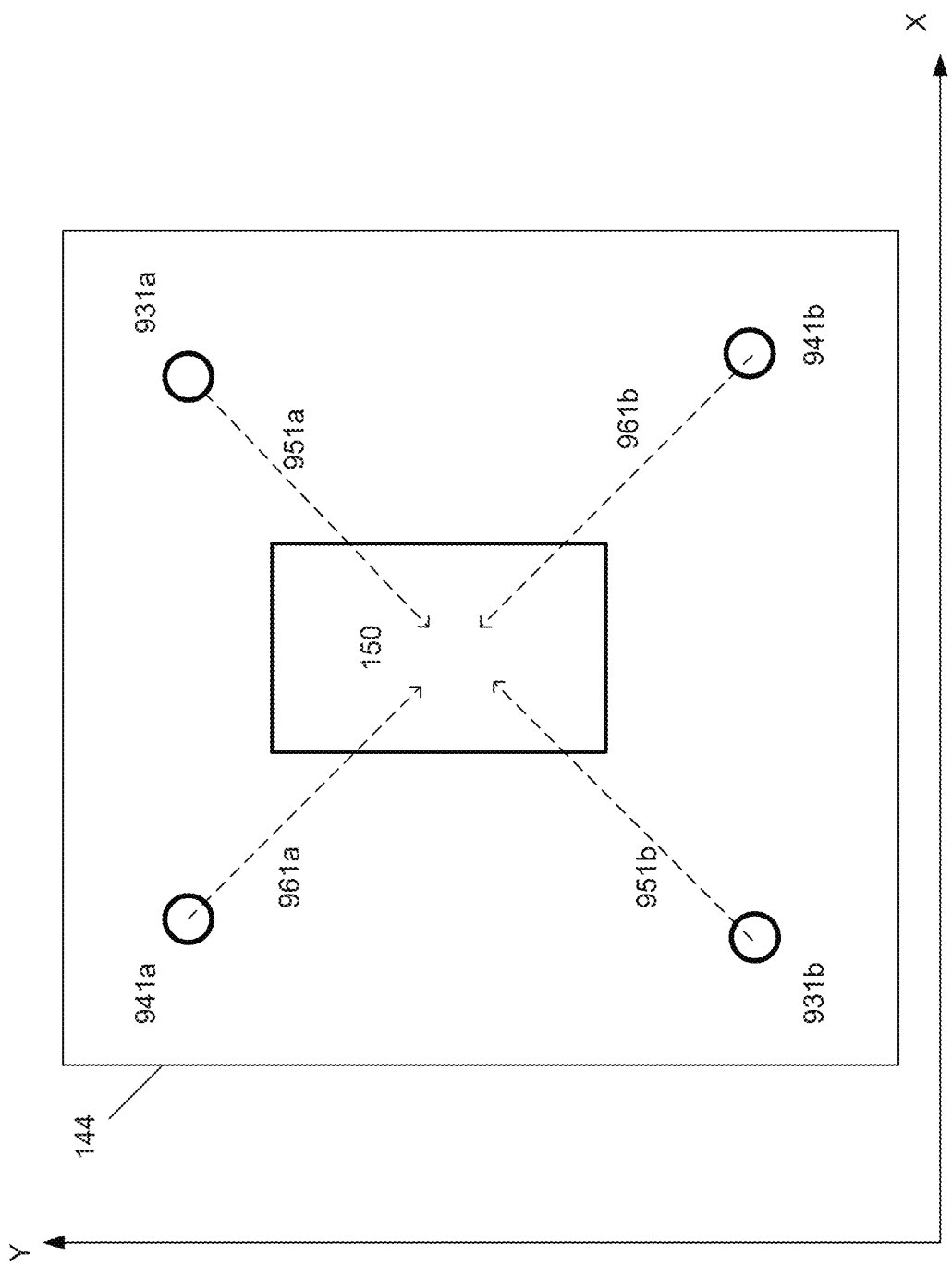
FIG. 9B illustrates an example arrangement of two sets of light sources in accordance with some embodiments of the present technology.

In some embodiments, the one or more light sources includes two sets of light sources that are arranged orthogonal to each other. Because the cracks and/or scratches on the mobile device 150 can run in different directions (e.g., both horizontally and/or vertically), having two sets of orthogonally arranged light sources allows the cameras to capture various combinations of the cracks and/or scratches. For example, a first angle between light beams from one set of lights and the top side of the inspection plate 144 can be between 30 to 60 degrees (e.g., preferably 45 degrees) while a second angle between light beams from a second set of lights and the left side of the inspection plate 144 can be between 30 to 60 degrees (e.g., preferably 45 degrees). The two sets of lights are positioned orthogonal to each other. FIG. 9B illustrates an example arrangement of two sets of light sources in accordance with some embodiments of the present technology. A first set of light sources 931a,b is arranged orthogonally with a second set of light sources 941a,b. Light beams 951a,b from the first set of light sources 931a,b are about 45 degrees from either side of the inspection plate 144 (e.g., X axis and/or Y axis). Similarly, light beams 961a,b from the second set of light sources 941a,b are about 45 degrees from either side of the inspection plate 144 (e.g., X axis or/or y axis). Such arrangement can help reduce or eliminate imaging noise or shadows from other components of the kiosk 100 that are arranged along the sides of the inspection plate. In some embodiments, additional sets of light sources can be arranged within the upper and/or lower chamber to reveal damage that can not be visible from orthogonal arrangements of the light sources.

In some embodiments, the light beams from the one or more light sources can be collimated to produce more defined shadows of the cracks and/or scratches. In some embodiments, the one or more light sources support a wide range of brightness so that multiple sets of images can be taken at different light intensities with exposure times. For example, different devices can have different background colors (e.g., a white phone or a black phone), which can affect the processing of the captured images. Having at least two sets of images taken at different camera exposures, different light intensities, and/or different white balance settings can allow more accurate processing of cosmetic features of the device.

Because the mobile phone 150 is positioned on the transparent plate 144, light beams from light sources disposed in the lower chamber 132 undergo additional reflections within the transparent plate 144 before reaching the mobile phone 150, thereby impacting the quality of the captured images. Therefore, in some embodiments, all cameras of the imaging device 190 and the light sources are disposed within the upper chamber 130 only. The kiosk 100 can include a flipping mechanism 148 (e.g., a robot arm) to flip the mobile phone 150 so that images of both the top and bottom surfaces of the mobile phone 150 can be captured without any reflections between the cameras and the mobile phone 150.

Furthermore, to improve quality of the captured images, the color of the upper chamber 130 and the lower chamber 132 can be a middle gray, such as the 18% gray for calibrating light meters. A proper color of the chambers provides enough contract for glints over the display and shadows of hairline cracks of the mobile phone 150.

The images captured by the kiosk 100 can be transmitted to a qualified human operator to examine the quality of images as a measure of ensuring input quality to the computer-implemented visual analysis. Alternatively, the captured images can be transmitted to another neural network model to automatically determine the quality of the images and to provide feedback to the kiosks. If an operator or the neural network model determines that images captured by a particular kiosk routinely demonstrate certain defects (e.g., images are too dark, images are overexposed, etc.), technicians can be dispatched to re-calibrate the kiosk to ensure that uniform input images are obtained at different kiosks.

In some embodiments, the upper chamber 130 and/or the lower chamber 132 can also include one or more magnification tools, scanners (e.g., bar code scanners, infrared scanners, etc.), or other imaging components (not shown) and an arrangement of mirrors (also not shown) to view, photograph, and/or otherwise visually evaluate the mobile phone 150 from multiple perspectives. In some embodiments, one or more of the cameras and/or other imaging components discussed above can be movable to facilitate device evaluation. For example, as noted above with respect to FIG. 1A, the imaging device 190 can be affixed to a moveable mechanical component, such as an arm, which in turn can be moved using a belt drive, rack and pinion system, or other suitable drive system coupled to an electronic controller (e.g., the computing device). The inspection area 108 can also include weight scales, heat detectors, UV or infrared readers/detectors, and the like, for further evaluation of electronic devices placed therein. For example, information from the weight scales, UV, or infrared readers/detections can provide accurate information to facilitate the determination of the model of the mobile phone 150. The kiosk 100 can further include an angled binning plate 136 for directing electronic devices from the transparent plate 144 into a collection bin 134 positioned in a lower portion of the kiosk 100.

Figure 1E:
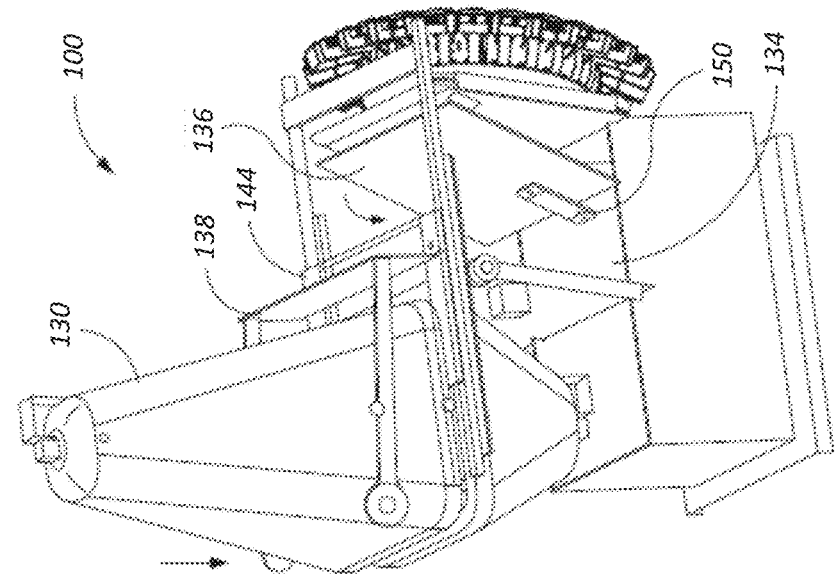
Figure 5:
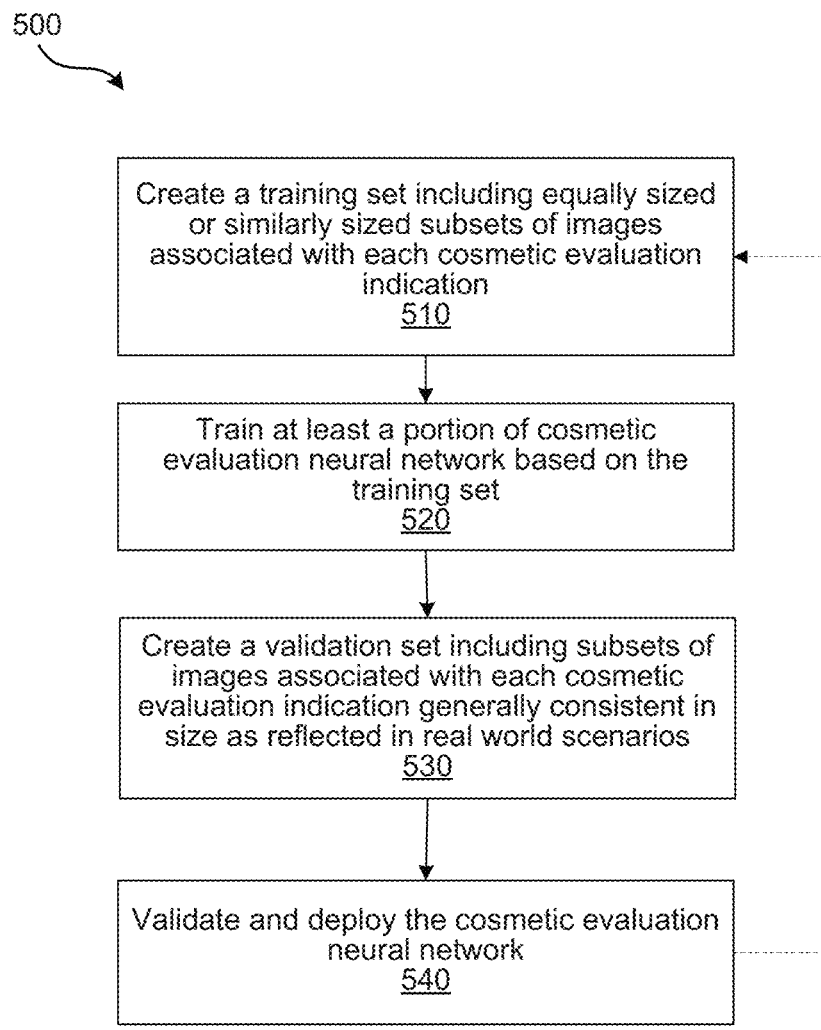
FIG. 5 is a flowchart illustrating a method for training a neural network for evaluating the cosmetic condition of electronic devices in accordance with some embodiments of the present technology.
Figure 6:
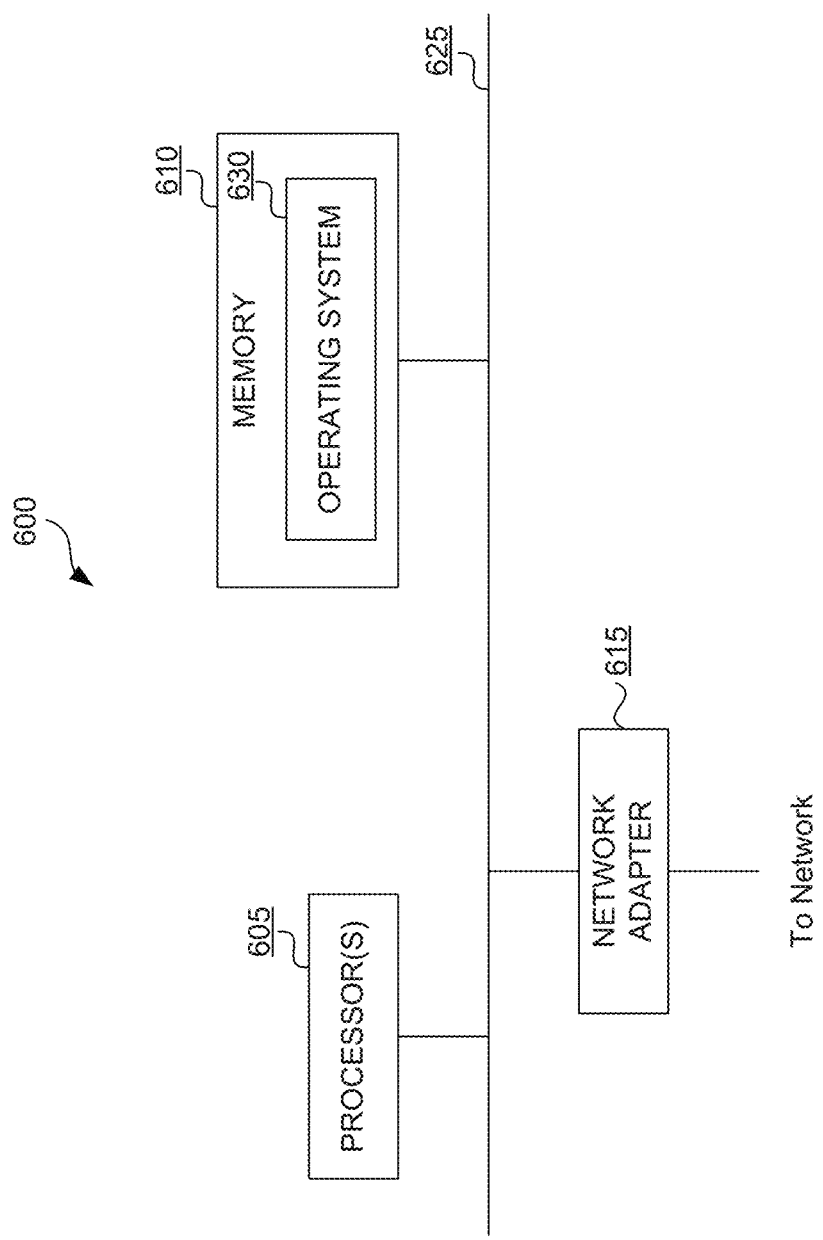
FIG. 6 is a block diagram illustrating an example architecture for a computer system that can be utilized to implement various portions of the present technology.

The kiosk 100 can be used in a number of different ways to efficiently facilitate the recycling, selling, and/or other processing of mobile phones and other consumer electronic devices. Referring to FIGS. 1A-1E together, in one embodiment, a user 101 wishing to sell a used mobile phone, such as the mobile phone 150, approaches the kiosk 100 and identifies the type of device (e.g., a mobile phone, a tablet, etc.) the user wishes to sell in response to prompts on the display screen 104. Next, the user can be prompted to remove any cases, stickers, or other accessories from the device so that it can be accurately evaluated. Additionally, the kiosk 100 can print and dispense a unique identification label (e.g., a small adhesive-backed sticker with a quick response code ("QR code"), barcode, or other machine-readable indicia, etc.) from the label outlet 110 for the user to adhere to the back of the mobile phone 150. After this is done, the door 106 retracts and opens allowing the user to place the mobile phone 150 onto the transparent plate 144 in the inspection area 108 as shown in FIG. 1B. The door 106 then closes and the transparent plate 144 moves the mobile phone 150 under the upper chamber 130 as shown in FIG. 1C. The upper chamber 130 then moves downwardly to generally enclose the mobile phone 150 between the upper and lower chambers 130 and 132, and the cameras and/or other imaging components in the upper and lower chambers 130 and 132 perform a visual inspection of the mobile phone 150. In some embodiments, the visual inspection of the mobile phone 150 includes performing at least a part of method 200 (as shown in FIG. 2), at least a part of method 500 (as shown in FIG. 5), and/or at least a part of method 600 (as shown in FIG. 6) to evaluate the physical and/or cosmetic condition of the mobile phone 150. In some embodiments, the visual inspection includes a computer-implemented visual analysis (e.g., a three-dimensional (3D) analysis) performed by a processing device within the kiosk to confirm the identification of the mobile phone 150 (e.g., make, model, and/or sub-model) and/or to evaluate or assess the condition and/or function of the mobile phone 150 and/or its various components and systems. For example, the visual analysis can include computer-implemented evaluation (e.g., a digital comparison) of images of the mobile phone 150 taken from top, side, and/or end view perspectives to determine length, width, and/or height (thickness) dimensions of the mobile phone 150. The visual analysis can further include a computer-implemented inspection of a display screen and/or other surface of the mobile phone 150 to check for, for example, cracks in the glass and/or other damage or defects in the LCD (e.g., defective pixels, etc.).

Figure 1D:
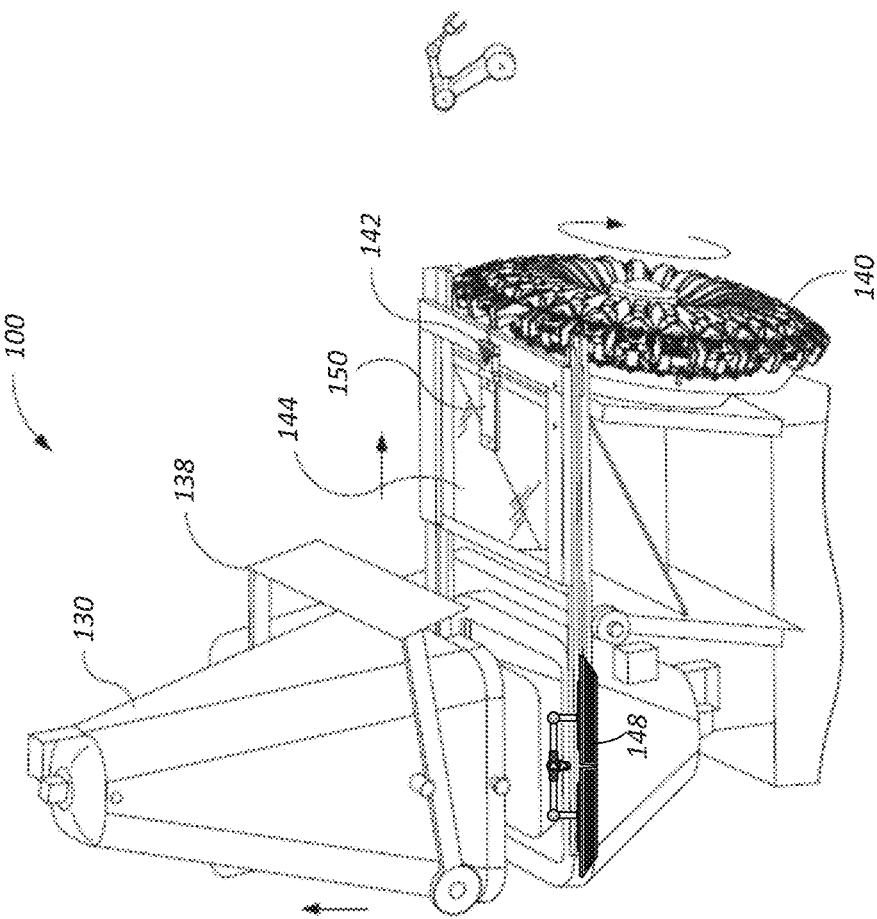
Figure 2:
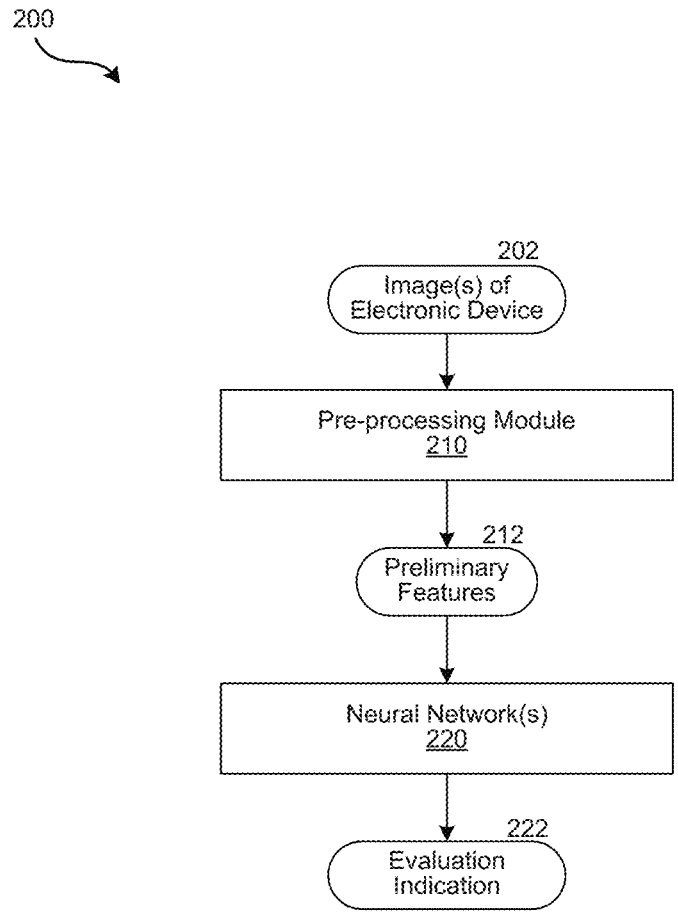
FIG. 2 is a flowchart illustrating a method for evaluating the cosmetic condition of electronic devices in accordance with some embodiments of the present technology.

Referring next to FIG. 1D, after the visual analysis is performed and the device has been identified, the upper chamber 130 returns to its upper position and the transparent plate 144 returns the mobile phone 150 to its initial position near the door 106. The display screen 104 can also provide an estimated price, or an estimated range of prices, that the kiosk 100 can offer the user for the mobile phone 150 based on the visual analysis, and/or based on user input (e.g., input regarding the type, condition, etc., of the phone 150). If the user indicates (via, e.g., input via the touch screen) that they wish to proceed with the transaction, the connector carrier 140 automatically rotates an appropriate one of the connectors 142 into position adjacent the transparent plate 144, and door 106 is again opened. The user can then be instructed (via, e.g., the display screen 104) to withdraw the selected connector 142 (and its associated wire) from the carrousel 140, plug the connector 142 into the corresponding port (e.g., a USB port) on the mobile phone 150, and reposition the mobile phone 150 in the inspection area on the transparent plate 144. After doing so, the door 106 once again closes and the kiosk 100 (e.g., the kiosk CPU) performs an electrical inspection of the device via the connector 142 to further evaluate the condition of the phone, as well as specific component and operating parameters, such as the memory, carrier, etc. In some embodiments, the electrical inspection can include a determination of phone manufacturer information (e.g., a vendor identification number or VID) and product information (e.g., a product identification number or PID). In some embodiments, the kiosk 100 can perform the electrical analysis using one or more of the methods and/or systems described in detail in the commonly owned patents and patent applications identified herein and incorporated by reference in their entireties.

After the visual and electronic analysis of the mobile phone 150, the user 101 is presented with a phone purchase price via the display screen 104. If the user declines the price (via, e.g., the touch screen), a retraction mechanism (not shown) automatically disconnects the connector 142 from the mobile phone 150, the door 106 opens, and the user can reach in and retrieve the mobile phone 150. If the user accepts the price, the door 106 remains closed and the user can be prompted to place his or her identification (e.g., a driver's license) in the ID scanner 112 and provide a thumbprint via the fingerprint reader 114. As a fraud prevention measure, the kiosk 100 can be configured to transmit an image of the driver's license to a remote computer screen, and an operator at the remote computer can visually compare the picture (and/or other information) on the driver's license to an image of the person standing in front of the kiosk 100 as viewed by one or more of the cameras 116a-c as shown in FIG. 1A to confirm that the person attempting to sell the phone 150 is in fact the person identified by the driver's license. In some embodiments, one or more of the cameras 116a-c can be movable to facilitate viewing of kiosk users, as well as other individuals in the proximity of the kiosk 100. Additionally, the person's fingerprint can be checked against records of known fraud perpetrators. If either of these checks indicate that the person selling the phone presents a fraud risk, the transaction can be declined and the mobile phone 150 returned. After the user's identity has been verified, the transparent plate 144 moves back toward the upper and lower chambers 130 and 132. As shown in FIG. 1E, when the upper chamber 130 is in the lower position, the gate 138 permits the transparent plate 144 to slide underneath but not electronic devices carried thereon. As a result, the gate 138 knocks the mobile phone 150 off of the transparent plate 144, onto the binning plate 136 and into the bin 134. The kiosk can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet etc.), Bitcoin, etc.

As those of ordinary skill in the art will appreciate, the foregoing routines are but some examples of ways in which the kiosk 100 can be used to recycle or otherwise process consumer electronic devices such as mobile phones. Although the foregoing example is described in the context of mobile phones, it should be understood that the kiosk 100 and various embodiments thereof can also be used in a similar manner for recycling virtually any consumer electronic device, such as MP3 players, tablet computers, PDAs, and other portable devices, as well as other relatively non-portable electronic devices, such as desktop computers, printers, devices for implementing games, entertainment or other digital media on CDs, DVDs, Blu-ray, etc. Moreover, although the foregoing example is described in the context of use by a consumer, the kiosk 100 in various embodiments thereof can similarly be used by others, such as a store clerk, to assist consumers in recycling, selling, exchanging, etc., their electronic devices.

Figure 8:
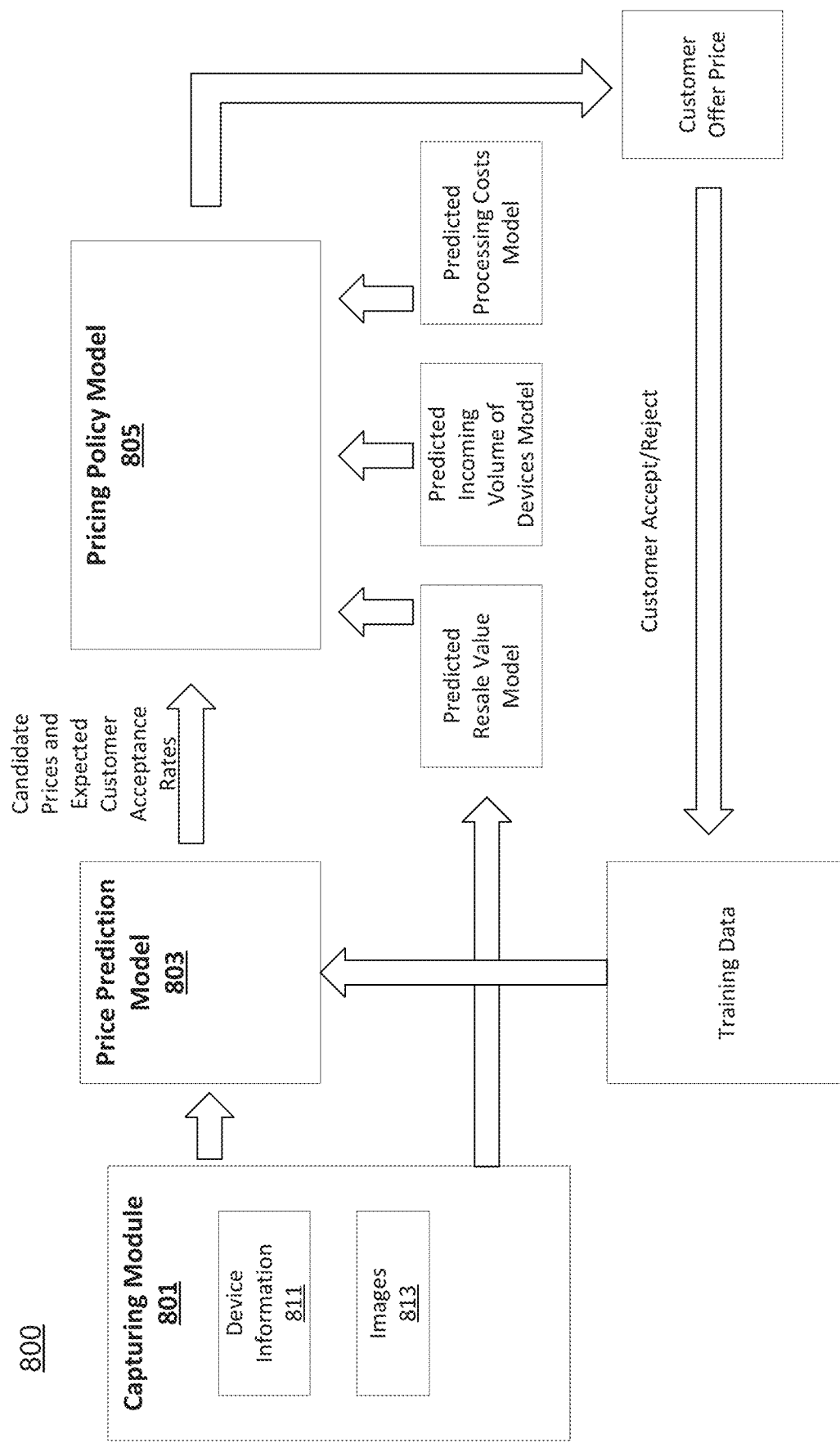
FIG. 8 illustrates an example architecture of a system for examining consumer devices and providing offer prices in accordance with some embodiments of the present technology.

FIG. 8 illustrates an example architecture of a system 800 for examining consumer devices and providing offer prices in accordance with some embodiments of the present technology. The system 800 includes a capturing module 801 that captures information about consumer devices. The capturing module 801 can be implemented on a kiosk as described in connection with FIGS. 1A-1E. The capturing module 801 can capture device information 811 such as the device identifier (ID) of a consumer device, the time and/or the location that the consumer device is examined. The capturing module 801 can also capture images 813 of various surfaces of the device that demonstrate various features, such as cosmetic defect(s) of the consumer device, which can indicate the condition of the device. For example, images can be captured to show sides of the device, location or existence of buttons on the device, light emitted from the screen to indicate the LCD panel health. In some embodiments, images can be captured while the device is moving so as to capture the nature and extent of the damage. The images can also show depth of scratches and/or cracks to facilitate an estimation of the impact to underlying electronics. In some embodiments, the entire system 800 can be implemented on the kiosk 100.

The input information captured by the capturing module 801 is transmitted to a price prediction model 803 that is configured to determine candidate price for the input consumer device. The price prediction model 805 can extract features (e.g., scratches, hairline cracks, water damage marks) from the input information and determine the candidate price based on the number of cosmetic defects on the device. Alternatively and/or additionally, the capturing module 801 can extract features from the input information and transmit the extracted features to the price prediction model 803 to determine the candidate price based on the number of cosmetic defects on the device.

The system 800 also includes a pricing policy model 805 that accepts input from both the capturing module 801 and the price prediction model 805. The pricing policy model 805 can leverage various sub-models to generate a final offer price. The sub-models can include at least a sub-model to predict resale value, a sub-model to predict incoming volume of the consumer device, a sub-model to predict processing costs associated with the device, and/or other sub-models to facilitate the prediction process. Additional features that can affect the final offer price include the location of kiosk, the time at which the device was examined, the age of the device, the predicted repair costs, volume of devices in similar conditions, risk of counterfeit or fraud, the anticipated demand of the device, predicted resale channels, other electrical information retrieved from the device. These sub-models can locate centrally with the pricing policy model. The sub-models can also be distributed across different locations in a network as part of a cloud-based computing service. Each of the models and/or sub-models can be implemented using a neural network, such as CNN and/or ConvNet. As compared to human operators, the neural networks can produce more consistent analysis results across different geographical locations and are much more scalable when a large number of consumer devices need to be evaluated.

Upon customer's acceptance or rejection of the final offer price, the relevant data for this consumer device can be fed back to the price prediction model for further training and improvement of the model. As mentioned above, the capturing module 801 can be deployed in a kiosk while the other parts of the system are situated in a distributed manner in remote server(s). In some embodiments, the entire system can be deployed in a kiosk as described in detail in connection with FIGS. 1A-1E.

Figure 10:
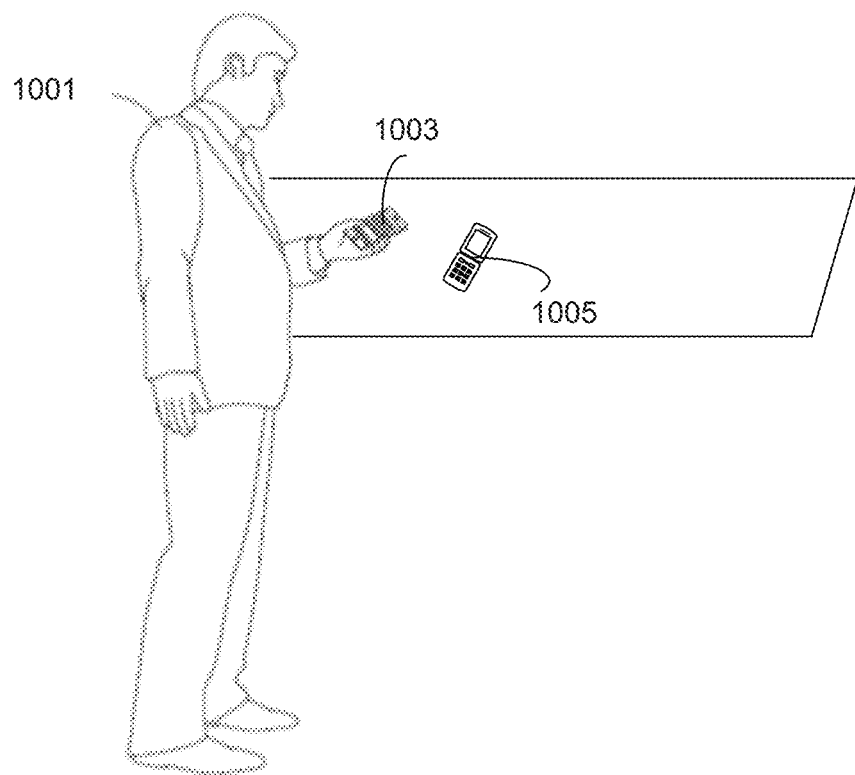
FIG. 10 illustrates an example of evaluating an electronic device using another mobile device in accordance with some embodiments of the present technology.

In some embodiments, instead of finding a kiosk to perform evaluation of a used consumer device (as discussed in connection with FIGS. 1A-E), the customer can download and install a software implementation of the capturing module 801 on another device (e.g., another mobile phone, tablet, wearable device, and so on). The software implementation of the capturing module 801 can provide a user interface to the customer to specify device information 811 (e.g., device ID, brand, model, etc.) and to capture images 813 of the target consumer device. FIG. 10 illustrates an example of evaluating an electronic device 1005 using another mobile device 1003 in accordance with some embodiments of the present technology. A customer 1001 can download a software application on his current mobile device 1003 (also referred to as the capturing device). The software application is configured to control one or more of a light source (e.g., a flash light) and/or camera(s) of the mobile device 1003 to capture at least one image of a target electronic device 1005. The customer 1001 can also be prompted to provide additional information about the target device 1005, such as device manufacturer, model, purchase date, general condition(s), device features, etc., via a user interface.

Referring back to FIG. 8, the input data (e.g., the captured images and/or additional device information provided by the customer) can be transmitted over a network to remote server(s) that host the price prediction model 803 and the pricing policy model 805 to determine the condition of the target device and/or a final offer price. Once the final offer price is determined, the capturing module 801 can display the final offer price of the target device on a user interface of the capturing device, and the customer can determine whether to accept or reject the offer price. Upon customer's acceptance or rejection of the final offer price, the relevant data for this consumer device can be fed back to the price prediction model 803 for further training of the model. If the customer accepts the offer price, the capturing module 801 can provide further instructions to package and mail the device to corresponding recycling and processing center(s).

To ensure image quality of the captured images, in some embodiments, the capturing module 801 can control the light source(s) of the capturing device to produce various light conditions. The capturing model 801 can further provide a set of predetermined settings or templates to guide the customer to take images of the target consumer device. Each setting or template can specify at least a desired angle to hold the capturing device with respect to the used consumer device, a desired exposure level, a desired light intensity, a desired white balance level, brightness, contrast, and/or other parameters. The predetermined templates help users to capture uniform input data to allow the system to generate consistent analysis results.

In some cases, network bandwidth limit can cause delays when a large amount of input date (e.g., a large set of images) needs to be transmitted to the remote server(s). To address such problems, some of the computation logic (e.g., pre-processing of the captured image) can be deployed locally on the capturing device. For example, a neural network that performs feature extraction to extract cosmetic defects (e.g., scratches, cracks, water marks, etc.) can be deployed on the capturing device as a part of the capturing module. Once the features are extracted, only the extracted features and information about the device (e.g., device ID, model, release date) are transmitted over the network to the prediction and policy models, thereby reducing bandwidth requirements for transmitting the relevant data.

In some embodiments, pre-processing of the images also includes operations, such as filtering, scrubbing, normalization, or the like, to generate preliminary features as input to feed into the neural network(s). As discussed above, pre-processing the captured images can alleviate network bandwidth limit for transmitting data in some embodiments. Pre-processing of the images can also be particularly useful for capturing modules that are deployed on customers' own devices because, unlike the kiosks, customers generally do not have accurate control of the cameras and positions of the devices. For example, pre-processing can adopt object detection algorithms to remove images that fail to include any consumer devices. Pre-processing of the images can also generate uniform inputs that are suitable for visual analysis by the neural networks so as to produce consistent results. For example, based on image segmentation techniques, an image of an electronic device can be cropped to show one side (e.g., front, back, top, bottom, or the like) of the electronic device. For the same device, cropped images showing different sides can be combined into a single image.

FIG. 2 is a flowchart illustrating a method 200 for evaluating the cosmetic condition of electronic devices, in accordance with some embodiments of the present technology. With reference to FIG. 2, the method includes feeding one or more images of an electronic device to a pre-processing module 210. In some embodiments, the image(s) can be obtained by the various camera(s) and/or other imaging component(s) of the kiosk 100 as described with reference to FIGS. 1A-1E or a capturing device owned by the customer. As describe above, the image(s) can be pre-processed to generate preliminary features. In some embodiments, the pre-processing can be performed by the processing component of the kiosk 100 or by the capturing device. In other embodiments, the image(s) can be transmitted to a remote system or device (e.g., a cloud-based computing service), and at least some or all of the pre-processing operations can be performed remotely. Illustratively, an image of an electronic device can be cropped to show one side (e.g., front, back, top, bottom, or the like) of the electronic device. Alternatively or in addition, the images can be taken under natural and/or controlled lighting. Still further, the images can be taken while the device is powered on or off. For the same device, cropped images showing different sides, images taken under different lighting, images taken while the device is on or off, and/or images of the device taken with other controlled/uncontrolled conditions can be combined into a single image.

The pre-processing can further include resizing an image (either an original image, combined image, or otherwise processed image) to a predefined size. The image is resized to provide a uniform input to the cosmetic evaluation neural network. The predefined size for neural network input can be determined in a manner that generally does not affect ability to detect cosmetic defects. For example, the predefined size must be sufficiently large so that damages or defects shown in an original image still appear in the resized image. Illustratively, each image can be resized to 299×299 pixels. In some embodiments, if the image is a color image, the present technology can separate out the red, green, and blue color spaces and convert the image into a three-dimensional integer matrix.

In some embodiments, if the image is a color image, the present technology can separate out the various color spaces (e.g., the red, green, and blue color spaces) and convert the image into a multi-dimensional (e.g., three-dimensional) integer matrix. For example, as used in standard RGB encoding, each value in the matrix is an integer ranging from 0-255. In some embodiments, the matrix can be rescaled by dividing by 255 to create a decimal value between 0 and 1 for each matrix entry.

Figure 4A:
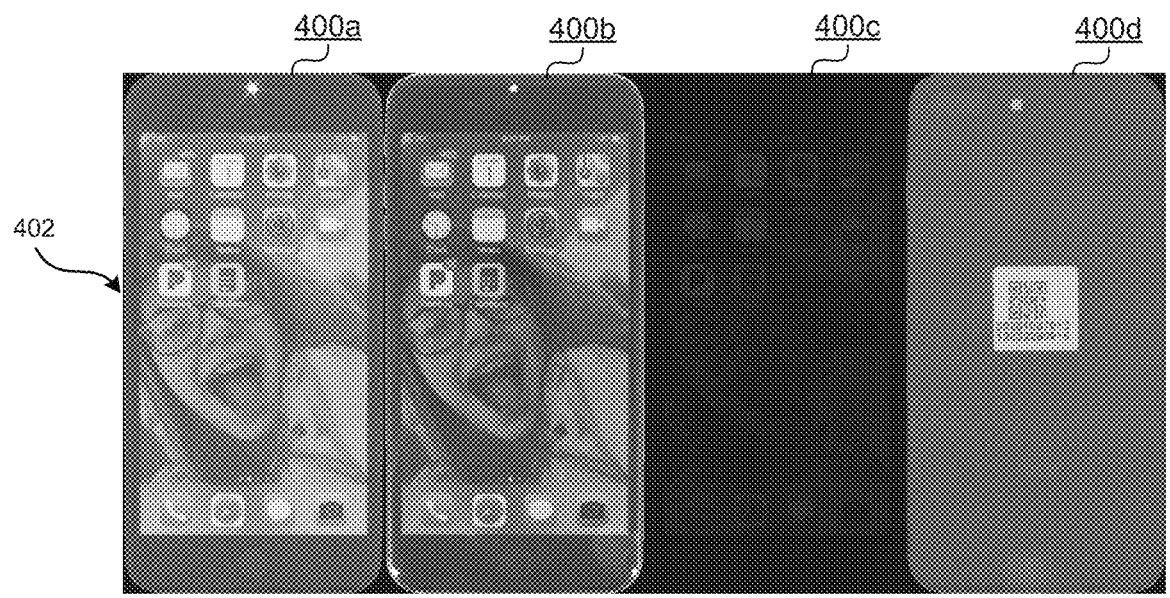
FIG. 4A illustrates examples of pre-processed images showing a front side of a smartphone in accordance with some embodiments of the present technology.
Figure 4B:
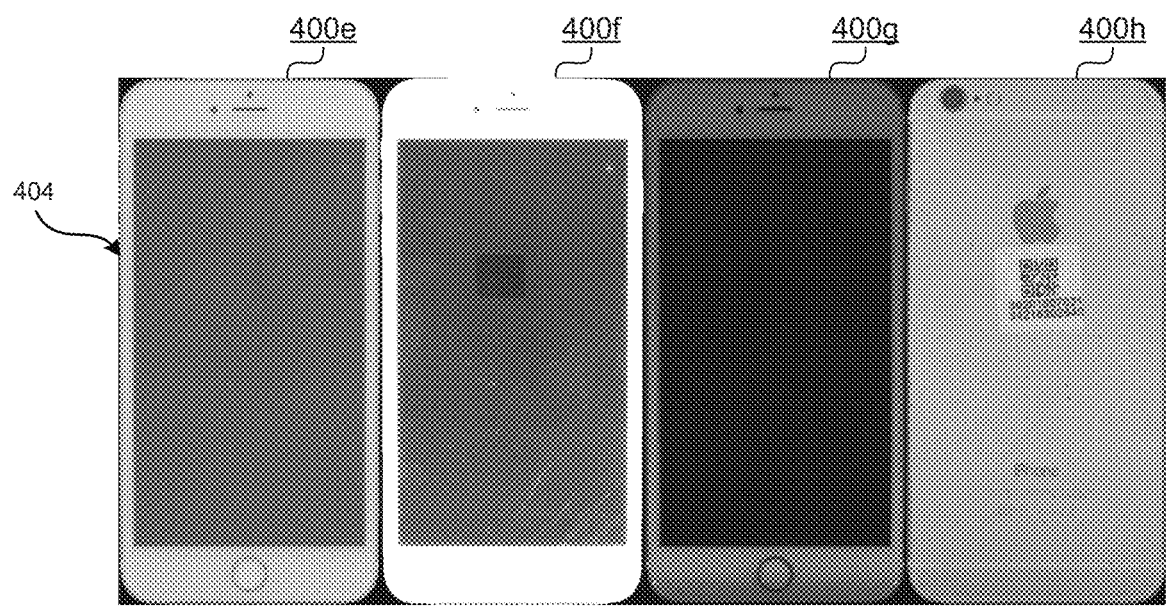
FIG. 4B illustrates other examples of pre-processed images showing a front side of a smartphone in accordance with some embodiments of the present technology.

FIGS. 4A and 4B illustrate examples of pre-processed images 400a-h for inputting into neural network(s) in accordance with some embodiments of the present technology. FIG. 4A illustrates a combined image showing the front side of a smartphone 402 under three different scenarios: lighting of a first white balance setting with the screen turned on 400a, lighting of a second white balance setting with the screen turned on 400b, the screen turned off 400c, and the back side of the smartphone 400d. The images do not show obvious scratches or hairline cracks, thus the smartphone 402 can be considered as in "cosmetically good" condition. FIG. 4B illustrates a combined image showing the front side of a smartphone 404 under three different scenarios: lighting of the first white balance setting with the screen turned on 400e, lighting of a second white balance setting with the screen turned on 400f, the screen turned off 400g, and the back side of the smartphone 400h. This combined image shows scratches on the screen of the smartphone 404, thus the smartphone 404 can be considered as in "cosmetically bad" condition.

Referring back to FIG. 2, the method 200 includes feeding the preliminary features 212 (e.g., original image, pre-processed image, or three-dimensional matrix depending on whether or how pre-processing is performed) into the neural network(s) 220. The neural network(s) can include the price prediction model and pricing policy model as shown in FIG. 1F. The method 200 further includes obtaining output 222 from the neural network(s) 220.

In some embodiments, the output of the neural network(s) includes an integer 0 or 1. Zero can represent "cosmetically good" (e.g., non-cracked, without significant scratches, or the like), and 1 can represent "cosmetically bad" (e.g., cracked, with significant scratches, or the like). In these embodiments, rescaling the inputs to a range between 0 and 1 can help the network train more consistently, as the inputs and outputs are more closely aligned. In some embodiments, instead of a binary value, the output of the neural network(s) can be a score of a range of values that indicate the severity of the damages on the consumer device. The output of the neural network(s) can also include at least one of a cosmetic rating or a category, a type of defect(s) detected, an orientation of defect(s) detected, a location of defect(s) detected, a size of defect(s) detected, associated confidence level(s), or other cosmetic evaluation indication. In some embodiments, the output of the neural network(s) can further include a brand, model, and/or type of the electronic device shown in the input image. Experimental results have demonstrated that the accuracy of neural network(s) in determining cosmetic defects can achieve 91%, which exceeds average human capacity (accuracy around 89.9%).

As discussed above, the neural networks 220 can be implemented as a part of the processing component of the kiosk 100 as described above with reference to FIGS. 1A-E or a user device. In other embodiments, at least some portion of the neural networks 220 can be implemented on a remote system or device (e.g., a cloud-based computing service). In these cases, the complete set of input date (e.g., images of the electronic device 202), the preliminary features 212, and/or certain intermediate data (e.g., the input/output between neural network layers) can be transmitted to the remote system or device for processing.

Figure 3:
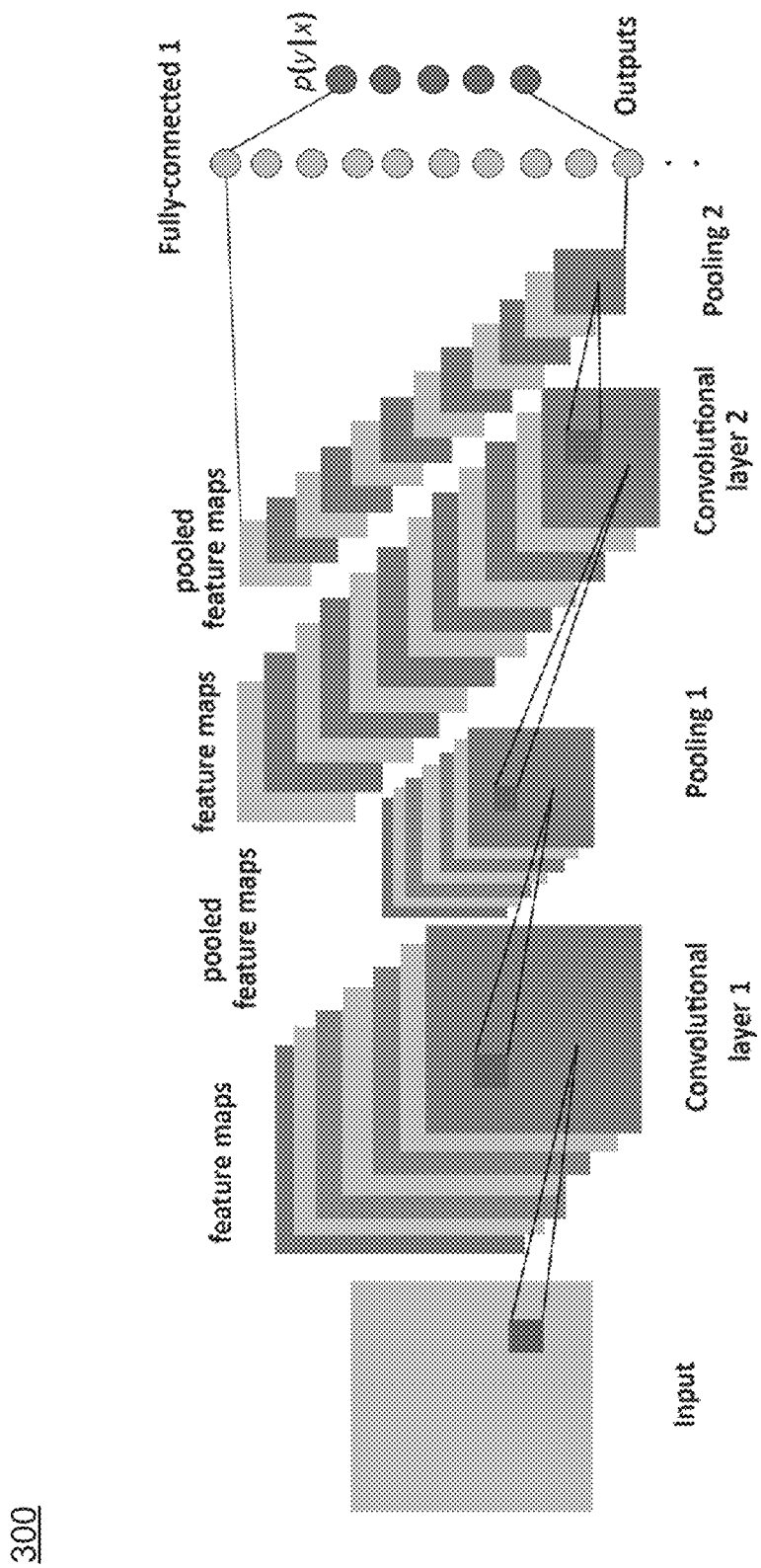
FIG. 3 illustrates an example neural network that can be implemented in accordance with some embodiments of the present technology.

FIG. 3 illustrates an example neural network 300 that can be implemented in accordance with some embodiments of the present technology. The example neural network 300 can be a CNN or a modified CNN. The example neural network 300 can include two main types of network layers, namely, the convolution layer and the pooling layer. A convolution layer can be used to extract various features from the input to convolution layer. In particular, different kernel sizes can be applied in convolution layers for feature extraction to account for the fact that scratches and/or hairline cracks have various sizes. A pooling layer can be utilized to compress the features that are input to the pooling layer, thereby reducing the number of training parameters for the neural network and easing the degree of model over-fitting. The example neural network 300 can include multiple cascaded convolution and pooling layers that are connected with one another in various structural arrangements (e.g., serial connection). In some embodiments, the final layers of the network can include a layer of dense fully connected nodes, a dropout layer to mitigate overfitting, and/or one or more sigmoid activations to derive the final classification. In some embodiments, a sigmoid activation can be used for binary prediction (e.g., outputting values 0 and 1 indicating whether the condition of the device is acceptable). In some embodiments, other types of activation (e.g., a softmax activation) can be used so that the neural network can output different categories of predictions (e.g., "Fraud-Do Not Buy", "Fake", etc).

Figure 11:
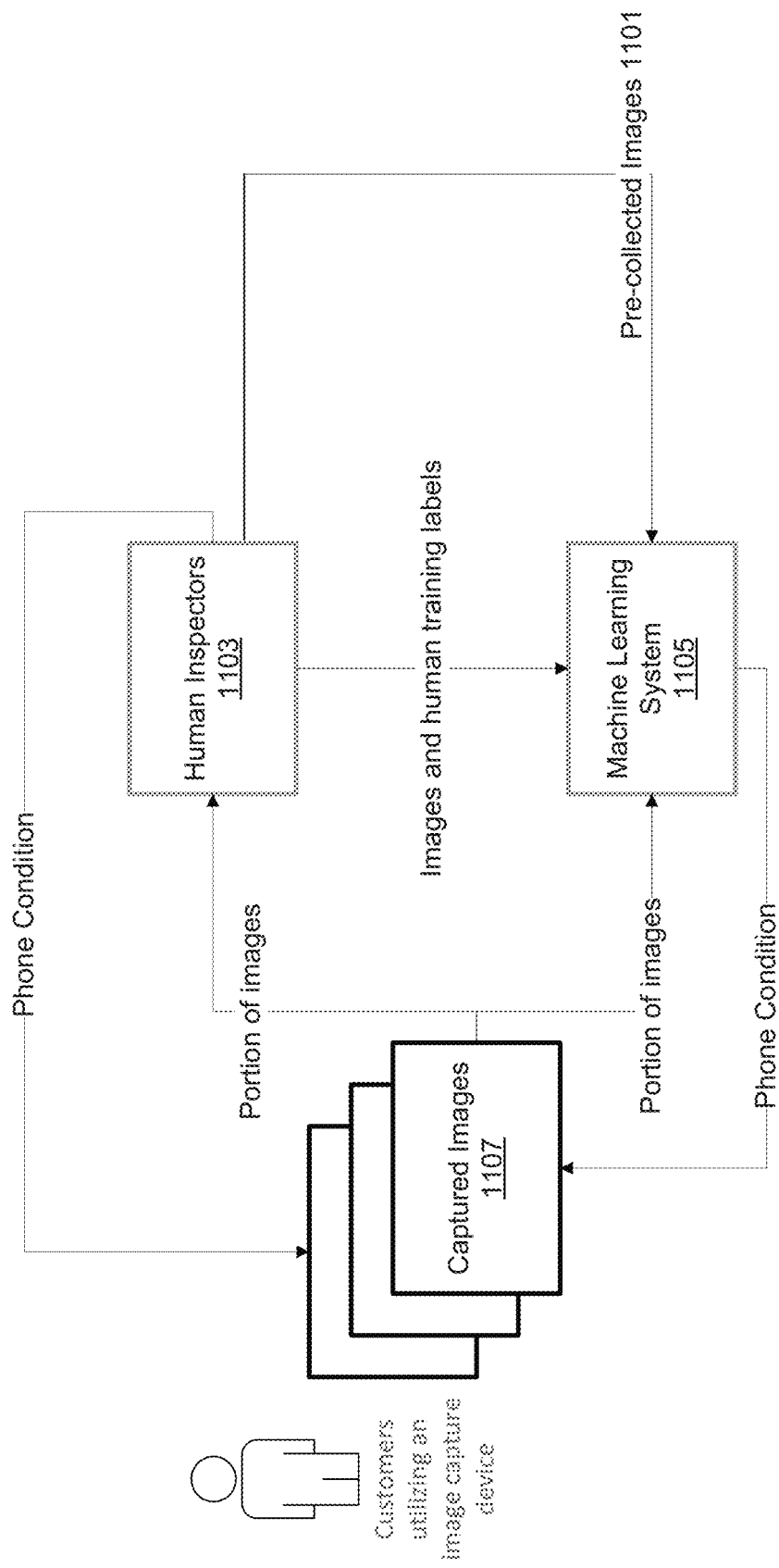
FIG. 11 illustrates an example architecture of training a neural network in accordance with some embodiments of the present technology.

FIG. 11 illustrates an example architecture 1100 of training a neural network in accordance with some embodiments of the present technology. As shown in FIG. 11, the neural networks can be trained using pre-collected images 1101 which have been labeled by inspectors 1103 (e.g., human inspectors, electronic labeling systems, etc.). In some embodiments, images in the training set are each associated with a cosmetic evaluation indication (e.g., "cosmetically good" or "cosmetically bad") agreed on by at least a threshold number of inspectors (e.g., two human inspectors). Therefore, the training set includes representative images of electronic devices in a particular cosmetic status that a threshold number of inspectors have agreed are, and the cosmetic status can be reasonably determined by visual inspection without requiring presence of the device phone on site.

The training set can include images that have been pre-processed the same way as would image(s) that contribute to the input of the machine learning system 1105 (e.g., neural network(s)) once it is deployed. The training set can include equal-sized or substantially equal-sized (e.g., within 5%, 10%, or 15% difference in size) subsets of images associated with each distinct cosmetic evaluation indication. For example, for approximately 700,000 images used in training, about 350,000 are associated with a "cosmetically good" indication and the other 350,000 are associated with a "cosmetically bad" indication. Dividing the training set in this manner can prevent or mitigate certain "random guess" effects of trained neural network(s), where an output can be biased to favor those reflected by a larger portion of the training set. In some embodiments, at least some of the images in the training set can be mirrored, rotated, or subject to other positional processing to generate additional images for inclusion in the training set.

The trained neural network 1105 can be validated using other pre-collected images which have been labeled by human inspectors 1103. Similar to the training set, a validation set can include subsets of images associated with each distinct cosmetic evaluation indication. In contrast with the training set, the relative sizes of the subsets are more consistent or otherwise reflect the real-world statistics of electronic devices that have previously been evaluated. Illustratively, approximately 300,000 images are used for validating the trained neural network.

In some embodiments, the machine learning system 1105 (e.g., neural network(s)) is deployed after successful validation (e.g., the false positive and/or false negative rate of the network's output over the validation set does not exceed predefined threshold(s)). Additional data, such as a portion of the captured images 1107 to the deployed network and/or associated outputs that have been verified by human inspectors, can be collected for further training of the neural network. In some embodiments, for each round of further training, layers closer (e.g., within a threshold number) to the input layer can be frozen while parameters of layers closer to the output can be adjusted. Doing so can help preserve concrete, basic aspects (e.g., representing small fractions of cracks in different orientations) already learned by the network while allowing the network to adjust parameters directed to more generalized, higher level features, which can efficiently adapt to newer models of devices, different lightings, and/or other changed scenarios. For example, the concrete, basic features learned when training on cracks for an iPhone 8 can still be applicable for detecting cracks on a Galaxy 9, even if the phones are different in size, shape, color, etc. In some embodiments, as shown in FIG. 11, a portion of the captured images can be directed to human inspectors 1103 to perform manual evaluation and/or generate more training data for the machine learning system 1105.

FIG. 5 is a flowchart illustrating a method 500 for training a neural network for evaluating the cosmetic condition of electronic devices in accordance with some embodiments of the present technology. In various embodiments, the method 500 can be performed by a remote system or device associated with the kiosk 100 as described with reference to FIGS. 1A-1E. With reference to FIG. 5, at block 510, the method 500 includes creating a training set including equally sized or similarly sized subsets of images associated with each distinct cosmetic evaluation indication.

The training set can include pre-collected images (e.g., those obtained by the kiosk 100) which have been labeled by human inspectors. In some embodiments, images in the training set are each associated with a cosmetic evaluation indication (e.g., "cosmetically good" or "cosmetically bad") agreed on by at least two human inspectors. The images in the training set can be pre-processed the same way as would image(s) that contribute to the input of the neural network once it is deployed. The training set can include equal-sized or substantially equal-sized (e.g., within 5%, 10%, or 15% difference in size) subsets of images associated with each distinct cosmetic evaluation indication. In some embodiments, at least some of the images in the training set can be mirrored, rotated, or subject to other positional processing to generate additional images for inclusion in the training set.

In addition, the training set can include information about the devices (e.g., brand, model, release date) so that the model can be trained to identify damages that are specific to a particular set of devices.

At block 520, the method 500 includes training at least a portion of the neural network based on the training set. Illustratively, the training set provides "ground-truth" samples of network input and associated output (e.g., sample image(s) of an electronic device and associated cosmetic evaluation indication), and the components of the neural network can be trained in various ways as deemed proper by those skilled in the art. The parameters of the neural network can be learned through a sufficiently large number of training samples in the training set.

At block 530, the method 500 includes creating a validation set, including subsets of images associated with each distinct cosmetic evaluation indication, that are generally consistent in relative size as reflected in real world statistics. Similar to the training set, a validation set can include subsets of images associated with each distinct cosmetic evaluation indication. In contrast with the training set, the relative sizes of the subsets can be more consistent or otherwise reflect the real-world statistics of electronic devices that have previously been evaluated.

At block 540, the method 500 includes validating the trained neural network, and if successful, deploy the neural network. As described above, in some embodiments, each class of output is equally (or substantially equally) represented during training, but the ratio among the output classes is more consistent with field statistics during validation. Such arrangements can be a basis for determining that the trained network is not generally classifying every input in a particular direction (e.g., a particular cosmetic evaluation indication), and can still effectively extract cosmetic condition(s) that is less represented in the dataset.

The neural network can be deployed (e.g., to be executed on the kiosk 100 or as a part of the capturing module on a customer's device) after successful validation (e.g., the false positive and/or false negative rate of the network's output over the validation set does not exceed predefined threshold (s)). In some embodiments, the method 500 includes collecting additional data (e.g., inputs to the deployed network and associated outputs that have been verified by human inspectors) for further training of the neural network. This can be achieved by looping back to block 510 of the method. In some embodiments, for each round of further training, layers closer (e.g., within a threshold number) to the input layer can be frozen while parameters of layers closer to the output can be adjusted. Doing so can help preserve concrete, basic aspects (e.g., representing small fractions of cracks in different orientations) already learned by the network while allowing the network to adjust parameters directed to more generalized, higher level features, which can efficiently adapt to newer models of devices, different lightings, and/or other changed scenarios.

FIG. 6 is a block diagram illustrating an example of the architecture for a computer system 600 that can be utilized to implement various portions of the present technology. In FIG. 6, the computer system 600 includes one or more processors 605 and memory 610 connected via an interconnect 625. The interconnect 625 can represent any one or more separate physical buses, point to point connections, or both, connected by appropriate bridges, adapters, or controllers. The interconnect 625, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 605 can include central processing units (CPUs) to control the overall operation of, for example, the host computer. In certain embodiments, the processor(s) 605 accomplish this by executing software or firmware stored in memory 610. The processor(s) 605 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 can be or include the main memory of the computer system. The memory 610 represents any suitable form of random access memory (RAM), read-only memory (ROM), flash memory, or the like, or a combination of such devices. In use, the memory 610 can contain, among other things, a set of machine instructions which, when executed by processor(s) 605, causes the processor(s) 605 to perform operations to implement embodiments of the present technology. In some embodiments, the memory 610 can contain an operating system (OS) 630 that manages computer hardware and software resources and provides common services for computer programs.

Also connected to the processor(s) 605 through the interconnect 625 is a (optional) network adapter 615. The network adapter 615 provides the computer system 600 with the ability to communicate with remote devices, such as the storage clients, and/or other storage servers, and can be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry can be in the form of, for example, one or more application-specific integrated circuits (ASICs), programmable logic devices (PLDs), field-programmable gate arrays (FPGAs), etc. Systems implemented using the disclosed techniques can be deployed either centrally (e.g., the kiosks) or in a distributed manner (e.g., client device and remote servers) according to network resources, bandwidth cost, desired performance, etc.

Software or firmware for use in implementing the techniques introduced here can be stored on a machine-readable storage medium and can be executed by one or more general-purpose or special-purpose programmable microprocessors. A "machine-readable storage medium," as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.). The term "logic," as used herein, can include, for example, programmable circuitry programmed with specific software and/or firmware, special-purpose hardwired circuitry, or a combination thereof.

Figure 7:
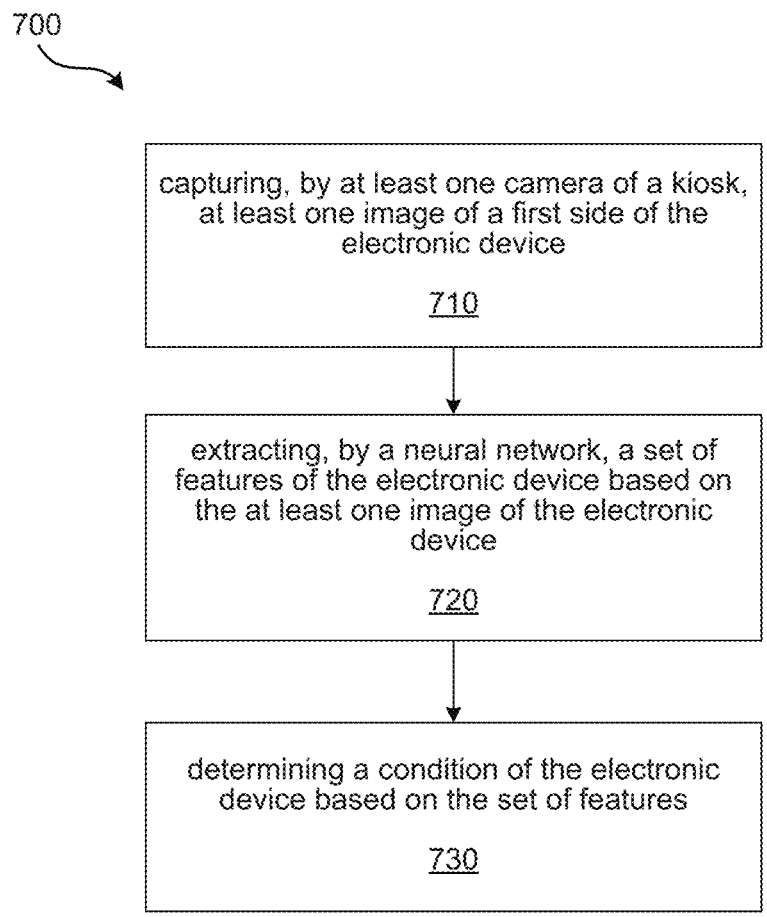
FIG. 7 is a flowchart representation of a method for evaluating a physical condition of an electronic device in accordance with some embodiments of the present technology.

FIG. 7 is a flowchart representation of a method 700 for evaluating a condition of an electronic device in accordance with some embodiments of the present technology. The method 700 includes, at operation 710, capturing, by at least one camera of a kiosk, at least one image of a first side of the electronic device, wherein the kiosk includes multiple light sources. The method 700 includes, at operation 720, extracting, by a neural network, a set of features of the electronic device based on the at least one image of the electronic device. The method 700 also includes, at operation 830, determining a condition of the electronic device based on the set of features.

In some embodiments, the method includes capturing, via the at least one camera, at least one image of a second side of the electronic device that is different from the first side based on at least one lighting condition generated by the multiple light sources. Using different settings of the light sources and/or cameras to create different lighting conditions can facilitate the imaging of the scratches and/or hairline cracks. To image the second side of the electronic device, the method can include, prior to capturing the at least one image of the second side of the electronic device, flipping the electronic device such that the light beams are directed towards the second side of the electronic device. In some embodiments, images are pre-processed as described in connection with FIGS. 4A-B. The method includes processing multiple images of multiple sides of the electronic device such that the multiple images have a uniform size and combining the multiple images into a single image to be provided to the neural network.

The angle of the light beams and the arrangement of the light sources can affect the final captured images, as discussed in connection with FIGS. 9A-B. In some embodiments, the method includes adjusting one of the multiple light sources such that an angle between a light beam from the light source and the first side of the electronic device is equal to or smaller than 60 degrees.

In some embodiments, the method includes determining a model of the electronic device in part based on the at least one image and identifying a cosmetic defect on the electronic device that is specific to the model. In some embodiments, the method includes determining, via a second neural network, an price for the electronic device in part based on the initial estimated price. The final offer price can be determined further based on at least (1) a predicted resale value of the electronic device, (2) a predicted incoming volume of a model of the electronic device, or (3) a predicted processing cost of the electronic device. In some embodiments, the method includes receiving an input from a user indicating an acceptance or a rejection of the final price and training the neural network in part based on the at least one image and the input from the user.

Some examples of the disclosed techniques are further described below.

Example 1

A system for evaluating a condition of an electronic device, comprising: a kiosk that includes an inspection plate configured to hold the electronic device, one or more light sources arranged above the inspection plate configured to direct one or more light beams towards the electronic device; and one or more cameras configured to capture at least one image of a first side of the electronic device based on at least one lighting condition generated by the one or more light sources. The system also includes one or more processors in communication with the one or more cameras, the one or more processors configured to extract a set of features of the electronic device based on the at least one image of the electronic device; and determine, via a first neural network, a condition of the electronic device based on the set of features.

Example 2

The system of example 1, wherein the one or more light sources comprises a first subset of light sources and a second subset of light sources, light beams of the first subset of light sources and light beams of the second subset of light sources arranged to be orthogonal to each other.

Example 3

The system of example 1 or 2, wherein the kiosk further includes: an upper chamber positioned above the inspection plate, wherein the one or more light sources are arranged within the upper chamber; a lower chamber positioned below the inspection plate, and a second set of light sources positioned within the lower chamber configured to direct light beams towards the electronic device through the inspection plate.

Example 4

The system of one or more of examples 1 to 3, wherein the kiosk further includes: a flipping mechanism configured to flip the electronic device to allow the one or more cameras to capture at least another image of a second side of the electronic device.

Example 5

The system of one or more of examples 1 to 4, wherein at least one of the one or more light sources is configured to produce a collimated light beam.

Example 6

The system of one or more of examples 1 to 5, wherein an angle between a light beam from one of the one or more light sources and the first side of the electronic device is equal to or smaller than 60 degrees.

Example 7

The system of one or more of examples 1 to 6, wherein the one or more cameras are configured to capture multiple images corresponding to multiple sides of the electronic devices under different lighting conditions, and wherein the one or more processors are configured to process and combine the multiple images into a single input image.

Example 8

The system of one or more of examples 1 to 7, wherein the first neural network is configured to output an indicator indicating the condition of the electronic device.

Example 9

The system of one or more of examples 1 to 8, wherein the one or more processors are further configured to determine an estimated price for the electronic device based on the condition.

In some embodiments, the kiosk is configured to provide information about the electronic device, and wherein the one or more processors are configured to invoke a second neural network to determine a final price for the electronic device based on the estimated price and the information about the electronic device.

Example 10

The system of one or more of examples 1 to 9, wherein the condition comprises a physical condition or a cosmetic condition.

Example 11

The system for evaluating a condition of an electronic device, comprising: a capturing device that comprises at least one light source and at least one camera, wherein the at least one camera is configured to capture multiple images of the electronic devices based on one or more predefined settings, each of the one or more predefined settings specifying at least one of: (1) an angle at which the capturing device is positioned with respect to the electronic device, (2) a light intensity of the at least one light source, (3) an exposure setting of the at least one camera, or (4) a white balance setting of the at least one camera. The system also includes one or more processors in communication with the capturing device, the one or more processors configured to process the multiple images to generate a single input image; extract a set of features of the electronic device based on the at least one image of the electronic device; and determine, via a first neural network, a condition of the electronic device.

In some embodiments, the capturing device is configured to provide information about the electronic device, and wherein the one or more processors are further configured to invoke a second neural network to determine a price for the electronic device based on the condition and the information about the electronic device.

Example 12

The system of example 11, wherein the condition comprises a physical condition or a cosmetic condition.

Example 13

A computer-implemented method for evaluating a condition of an electronic device, comprising: capturing, by at least one camera of a kiosk, at least one image of a first side of the electronic device, wherein the kiosk includes multiple light sources; extracting, by a neural network, a set of features of the electronic device based on the at least one image of the electronic device; and determining a condition of the electronic device based on the set of features.

Example 14

The method of example 13, comprising: capturing, via the at least one camera, at least one image of a second side of the electronic device that is different from the first side based on at least one lighting condition generated by the multiple light sources.

Example 15

The method of example 14, comprising, prior to capturing the at least one image of the second side of the electronic device: flipping the electronic device such that the light beams are directed towards the second side of the electronic device.

Example 16

The method of one or more of examples 13 to 14, comprising: processing multiple images of multiple sides of the electronic device such that the multiple images have a uniform size; and combining the multiple images into a single image to be provided to the neural network.

Example 17

The method of one or more of examples 13 to 16, comprising: adjusting one of the multiple light sources such that an angle between a light beam from the light source and the first side of the electronic device is equal to or smaller than 60 degrees.

Example 18

The method of one or more of examples 13 to 17, comprising: determining a model of the electronic device in part based on the at least one image; and identifying a cosmetic defect on the electronic device that is specific to the model.

In some embodiments, the method comprises determining, via a second neural network, an offer price for the electronic device in part based on the condition, wherein the offer price is determined further based on at least (1) a predicted resale value of the electronic device, (2) a predicted incoming volume of a model of the electronic device, or (3) a predicted processing cost of the electronic device.

Example 19

The method of one or more of examples 13 to 18, comprising: receiving an input from a user indicating an acceptance or a rejection of the offer price; and training the neural network in part based on the at least one image and the input from the user.

Example 20

The method of one or more of examples 13 to 19, wherein the condition comprises a physical condition or a cosmetic condition.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which can be exhibited by some embodiments and not by others. Similarly, various requirements are described which can be requirements for some embodiments but not other embodiments. As used herein, the phrase "and/or" as in "A and/or B" refers to A alone, B alone, and both A and B.

In other instances, well-known structures, materials, operations, and/or systems often associated with smartphones and other handheld devices, consumer electronic devices, computer hardware, software, and network systems, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below should be interpreted in its broadest reasonable manner, even though it is being used in conjunction with a detailed description of certain examples of embodiments of the technology. Indeed, certain terms can even be emphasized below; however, any terminology intended to be interpreted in any restricted manner will be specifically defined as such in this Detailed Description section.

The accompanying figures depict embodiments of the present technology and are not intended to be limiting of the scope of the present technology. The sizes of various depicted elements are not necessarily drawn to scale, and these various elements can be arbitrarily enlarged to improve legibility. Component details can be abstracted in the figures to exclude details such as the position of components and certain precise connections between such components when such details are unnecessary for a complete understanding of how to make and use the invention.

In the figures, identical reference numbers can identify identical, or at least generally similar, elements. To facilitate the discussion of any particular element, the most significant digit or digits of any reference number can refer to the figure in which that element is first introduced.

What is claimed is:

1. A system for evaluating a condition of an electronic device, comprising:
   a kiosk that includes:
      an inspection plate configured to hold the electronic device;
      one or more light sources arranged above the inspection plate and configured to direct one or more light beams towards the electronic device;
      one or more cameras configured to capture at least one image of a first side of the electronic device based on at least one lighting condition generated by the one or more light sources; and
      one or more processors in communication with the one or more cameras, the one or more processors configured to:
         extract a set of features of the electronic device based on the at least one image of the electronic device;
         apply a trained first neural network on the set of features to compute a score within a range of values and indicative of a severity of damage to the electronic device,
            wherein the first neural network is trained using a set of images associated with distinct cosmetic evaluation indications; and
            wherein an output of the first neural network comprises a brand and/or model of the electronic device;
         determine the condition of the electronic device based on the score and the brand and/or model; and
         determine, via a second neural network, an offer price for the electronic device based on the determined condition,
            wherein the second neural network is different from the first neural network.

2. The system of claim 1, wherein the one or more light sources comprises a first subset of light sources and a second subset of light sources, light beams of the first subset of light sources and light beams of the second subset of light sources arranged to be orthogonal to each other.

3. The system of claim 1, wherein the kiosk further includes:
   an upper chamber positioned above the inspection plate, wherein the one or more light sources are arranged within the upper chamber;
   a lower chamber positioned below the inspection plate; and
   a second set of light sources positioned within the lower chamber configured to direct light beams towards the electronic device through the inspection plate.

4. The system of claim 1, wherein the kiosk further includes:
a flipping mechanism configured to flip the electronic device to allow the one or more cameras to capture at least another image of a second side of the electronic device.

5. The system of claim 1, wherein at least one of the one or more light sources are configured to produce a collimated light beam.

6. The system of claim 1, wherein an angle between a light beam from one of the one or more light sources and the first side of the electronic device is equal to or smaller than 60 degrees.

7. The system of claim 1, wherein the one or more cameras are configured to capture multiple images corresponding to multiple sides of the electronic device under different lighting conditions, and wherein the one or more processors are configured to process and combine the multiple images into a single input image.

8. The system of claim 1, wherein the first neural network is configured to output an indicator indicating the condition of the electronic device.

9. The system of claim 1, wherein the one or more processors are further configured to determine an estimated price for the electronic device based on the condition.

10. The system of claim 1, wherein the condition comprises a physical condition or a cosmetic condition.

11. A system for evaluating a condition of an electronic device, comprising:
a capturing device that comprises at least one light source and at least one camera, wherein the at least one camera is configured to capture multiple images of the electronic device based on one or more predefined settings, each of the one or more predefined settings specifying at least one of: (1) an angle at which the capturing device is positioned with respect to the electronic device, (2) a light intensity of the at least one light source, (3) an exposure setting of the at least one camera, or (4) a white balance setting of the at least one camera; and
one or more processors in communication with the capturing device, the one or more processors configured to:
process the multiple images to generate a single input image;
extract a set of features of the electronic device based on the single input image;
apply a trained first neural network on the set of features to compute a score within a range of values and indicative of a severity of damage to the electronic device,
wherein the first neural network is trained using a set of images associated with distinct cosmetic evaluation indications; and
wherein an output of the first neural network comprises a brand and/or model of the electronic device;
determine the condition of the electronic device based on the score and the brand and/or model; and
determine, via a second neural network, an offer price for the electronic device based on the determined condition,
wherein the second neural network is different from the first neural network.

12. The system of claim 11, wherein the condition comprises a physical condition or a cosmetic condition.

13. A computer-implemented method for evaluating a condition of an electronic device, comprising:
capturing, by at least one camera of a kiosk, at least one image of a first side of the electronic device, wherein the kiosk includes multiple light sources;
extracting a set of features of the electronic device based on the at least one image of the electronic device;
applying a trained first neural network on the set of features to compute a score within a range of values and indicative of a severity of damage to the electronic device,
wherein the first neural network is trained using a set of images associated with distinct cosmetic evaluation indications; and
wherein an output of the first neural network comprises a brand and/or model of the electronic device;
determining the condition of the electronic device based on the score and the brand and/or model; and
determine, via a second neural network, an offer price for the electronic device based on the determined condition,
wherein the second neural network is different from the first neural network.

14. The method of claim 13, comprising:
capturing, via the at least one camera, at least one image of a second side of the electronic device that is different from the first side based on at least one lighting condition generated by the multiple light sources.

15. The method of claim 14, comprising, prior to capturing the at least one image of the second side of the electronic device:
flipping the electronic device such that light beams of the multiple light sources are directed towards the second side of the electronic device.

16. The method of claim 13, comprising:
processing multiple images of multiple sides of the electronic device such that the multiple images have a uniform size; and
combining the multiple images into a single image to be provided to the first neural network.

17. The method of claim 13, comprising:
adjusting one of the multiple light sources such that an angle between a light beam from the one of the multiple light sources and the first side of the electronic device is equal to or smaller than 60 degrees.

18. The method of claim 13, comprising:
identifying a cosmetic defect on the electronic device that is specific to the brand and/or model.

19. The method of claim 13, comprising:
receiving an input from a user indicating an acceptance or a rejection of the offer price; and
training the second neural network in part based on the at least one image and the input from the user.

20. The method of claim 13, wherein the condition comprises a physical condition or a cosmetic condition.

* * * * *